(12) United States Patent  
Charbonneau-Lefort et al.

(10) Patent No.: US 9,201,201 B2  
(45) Date of Patent: Dec. 1, 2015

(54) FIBER TRAYS, FIBER OPTICAL MODULES, AND METHODS OF PROCESSING OPTICAL FIBERS

(71) Applicant: Corning Cable Systems LLC, Hickory, NC (US)

(72) Inventors: Mathieu Charbonneau-Lefort, San Jose, CA (US); Michael de Jong, Colleyville, TX (US); Dennis Michael Knecht, Hickory, NC (US); Craig Alan Strause, Springtown, TX (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/838,417

(22) Filed: Mar. 15, 2013

(65) Prior Publication Data

US 2014/0099058 A1 Apr. 10, 2014

Related U.S. Application Data

(60) Provisional application No. 61/651,307, filed on May 24, 2012, provisional application No. 61/636,159, filed on Apr. 20, 2012.

(51) Int. Cl.
*G02B 6/32* (2006.01)
*G02B 6/42* (2006.01)
*G02B 6/43* (2006.01)

(52) U.S. Cl.
CPC ............ *G02B 6/4239* (2013.01); *G02B 6/4214* (2013.01); *G02B 6/4284* (2013.01); *G02B 6/423* (2013.01); *G02B 6/4206* (2013.01); *G02B 6/4243* (2013.01); *G02B 6/43* (2013.01)

(58) Field of Classification Search
CPC ... G02B 6/4239; G02B 6/4214; G02B 6/4284
USPC ...................................... 385/33, 89
See application file for complete search history.

(56) References Cited

U.S. PATENT DOCUMENTS 5,985,086 A * 11/1999 Peall ............................. 156/292
6,267,515 B1 * 7/2001 Okuda et al. ..................... 385/88

(Continued)

FOREIGN PATENT DOCUMENTS

CN        201886174 U     6/2011
CN        102346276       2/2012

(Continued)

OTHER PUBLICATIONS

Patent Cooperation Treaty, International Search Report for PCT/US2013/037407, Jul. 18, 2013, 14 pages.

(Continued)

*Primary Examiner* — Jerry Blevins

(57) ABSTRACT

Fiber trays and fiber optic modules and assemblies using the same are disclosed, wherein optical fibers are secured to a fiber tray that is then secured to a body of the fiber module. The body defines a plurality of lenses that reflect light using a total-internal-reflection surface to direct light to active optical components. The fiber tray is secured to the body such that the plurality of optical fibers may be secured within fiber support features of the body that align ends of the optical fibers to the lenses defined by the body. Optical-electrical connectors employing such two-piece fiber optic modules are also disclosed, as well as methods of processing a plurality of optical fibers using a fiber tray.

21 Claims, 12 Drawing Sheets

(56) References Cited

U.S. PATENT DOCUMENTS

| | | | |
|---|---|---|---|
| 7,399,125 B1 | 7/2008 | Whaley et al. ............... 385/92 |
| 8,277,130 B2 | 10/2012 | Nishimura et al. |
| 2001/0004413 A1* | 6/2001 | Aihara .......................... 385/88 |
| 2002/0110338 A1 | 8/2002 | Dair et al. |
| 2002/0141708 A1 | 10/2002 | Shin et al. |
| 2002/0181882 A1 | 12/2002 | Hibbs-Brenner et al. |
| 2003/0072538 A1 | 4/2003 | Jin et al. |
| 2005/0013554 A1 | 1/2005 | Killer et al. |
| 2005/0069256 A1* | 3/2005 | Jennings et al. ............. 385/33 |
| 2006/0039655 A1 | 2/2006 | Wilson |
| 2006/0104576 A1 | 5/2006 | Nagasaka |
| 2007/0183709 A1 | 8/2007 | Furuno et al. ................ 385/14 |
| 2007/0183725 A1 | 8/2007 | Nagasaka |
| 2008/0144999 A1 | 6/2008 | Takeda et al. |
| 2009/0154884 A1 | 6/2009 | Chen et al. |
| 2011/0052132 A1* | 3/2011 | Teymouri ................... 385/135 |
| 2011/0123150 A1 | 5/2011 | Zbinden et al. ............... 385/33 |
| 2011/0123151 A1 | 5/2011 | Zbinden et al. ............... 385/33 |
| 2011/0150400 A1 | 6/2011 | Nishimura et al. ........... 385/83 |
| 2012/0008902 A1 | 1/2012 | Wu ............................... 385/77 |
| 2012/0025209 A1 | 2/2012 | Kim et al. |
| 2012/0027345 A1 | 2/2012 | Castagna et al. ............. 385/33 |
| 2012/0027346 A1 | 2/2012 | Castagna et al. ............. 385/33 |
| 2012/0189254 A1 | 7/2012 | Wang et al. .................. 385/93 |
| 2012/0328245 A1 | 12/2012 | Lin |
| 2013/0209043 A1* | 8/2013 | Norris et al. ................. 385/80 |

FOREIGN PATENT DOCUMENTS

| | | |
|---|---|---|
| CN | 101828137 B | 9/2012 |
| WO | WO2006108024 | 10/2006 |
| WO | WO2012174227 | 12/2012 |
| WO | WO2014151204 | 9/2014 |

OTHER PUBLICATIONS

International Search Report and Written Opinion issued in related case PCT/US2013/037362, dated Oct. 30, 2014.

Rule 161 Communication issued in relatd case EP 13719211.8, dated Nov. 28, 2014.

* cited by examiner

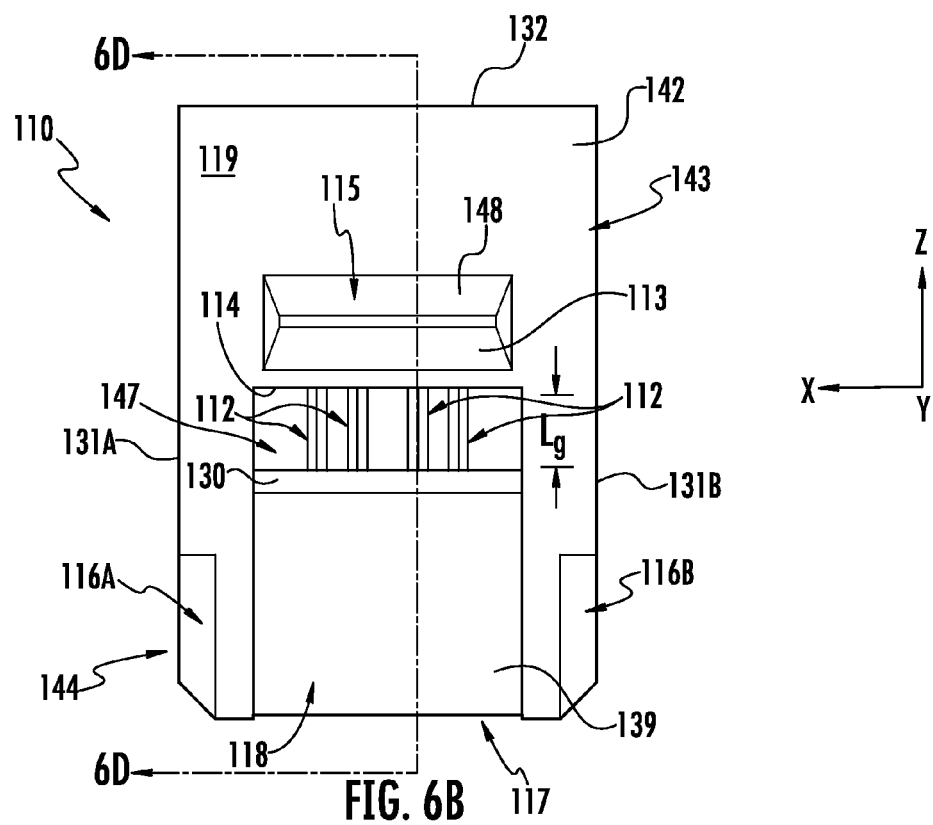
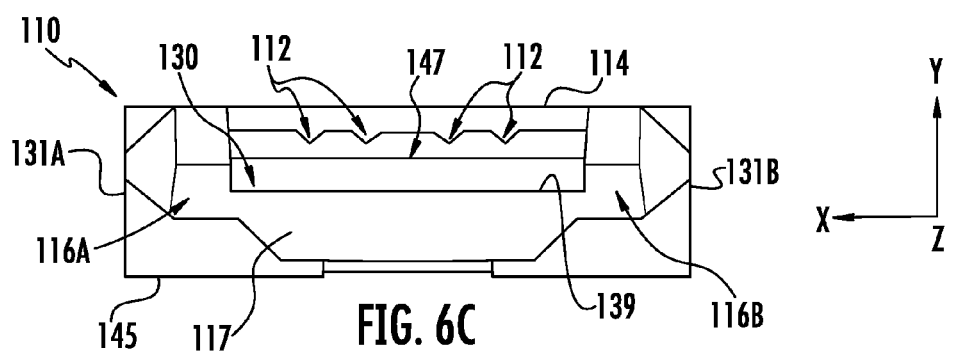
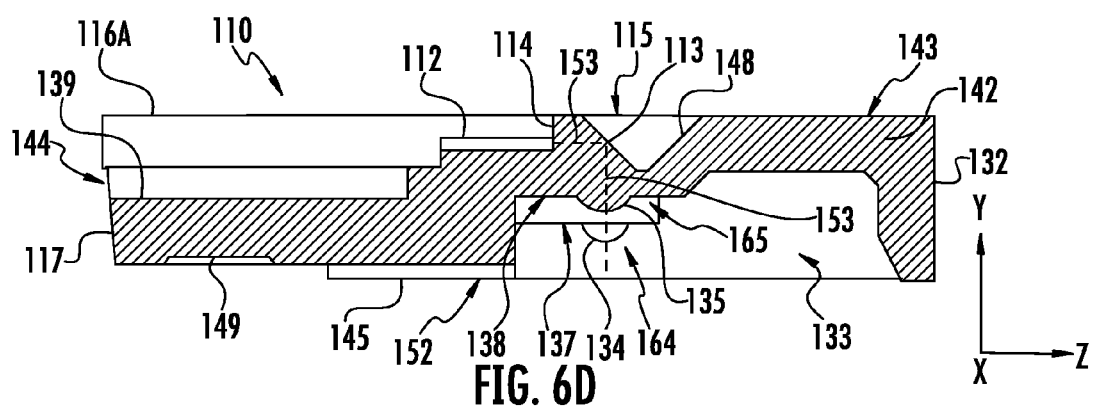

FIBER TRAYS, FIBER OPTICAL MODULES, AND METHODS OF PROCESSING OPTICAL FIBERS

CROSS REFERENCE TO RELATED APPLICATIONS

This application claims the benefit of priority under §119 of U.S. Provisional Application Ser. No. 61/636,159 filed on Apr. 20, 2012, and U.S. Provisional Application Ser. No. 61/651,307 filed on May 24, 2012, the content of which are relied upon and incorporated herein by reference in their entirety.

FIELD

The present disclosure generally relates to fiber optic modules and, more particularly, to fiber optic modules and optical-electrical connectors having a fiber tray coupled to a body that employs total internal reflection.

BACKGROUND

Short-distance data links used for consumer electronics are reaching increasingly higher data rates, especially those used for video and data storage applications. Examples include the USB 3.0 protocol at 5 Gb/s, HDMI at 10 Gb/s and Thunderbolt™ at 10 Gb/s over two channels. At such high data rates, traditional copper cables have limited transmission distance and cable flexibility. For at least these reasons, optical fiber is emerging as an alternative to copper wire for accommodating the high data rates for the next generations of electronic devices such as consumer devices.

Unlike telecommunication applications that employ expensive, high-power edge-emitting lasers along with modulators, short-distance optical fiber links are based on low-cost, low-power, directly modulated light sources such as vertical-cavity surface-emitting lasers (VCSELs). To be viable for consumer electronics and the like, the fiber optic assemblies used to couple light from the light source into an optical fiber in one direction (i.e., transmit) and light traveling in another optical fiber onto the photodiode in the other direction (i.e., receive) need to be low-cost. This requirement drives the need for the design of assemblies to be simple to manufacture while having suitable performance. Accordingly, there is an unresolved need for fiber optic modules that simplify the alignment of optical fibers.

SUMMARY

Embodiments of the present disclosure relate to two-piece fiber optic modules including a fiber tray and a body having a total-internal-reflection ("TIR") surface. The fiber tray, which maintains a plurality of optical fibers, is positioned in the body and secured. The ends of the optical fibers extending from the fiber tray are passively or actively positioned within the fiber support features of the body and secured to the body at the fiber support features with an adhesive such as an index-matching adhesive. The fiber ends are positioned such that they are disposed at a reference fiber-end datum surface such that they are in optical communication (i.e., optically aligned) with a plurality of lenses defined by the body. Methods of processing optical fibers using a fiber tray are also disclosed.

One aspect of the disclosure is a fiber tray for coupling with a body having a total-internal-reflection surface. The fiber tray includes a first surface and a second surface opposite from the first surface along with a plurality of fiber support features configured to receive a plurality of optical fibers. The fiber tray also includes a first adhesive receiving feature and a second adhesive receiving feature between the first surface and the second surface, and an adhesive well extending a depth into the fiber tray from the first surface and across the plurality of fiber support features.

Another aspect of the disclosure is the aforementioned fiber tray, wherein the adhesive well is positioned at the first surface.

Another aspect of the disclosure is the aforementioned fiber tray, wherein the first adhesive receiving feature and the second adhesive receiving feature are located closer to a second edge than a first edge.

Another aspect of the disclosure is the aforementioned fiber tray, further including a first additional adhesive receiving feature located at a third edge and a second additional adhesive receiving feature located at a fourth edge.

Another aspect of the disclosure is the aforementioned fiber tray, further including one or more tilting features. As an example, the fiber tray may include one or more protrusions extending from the second surface of the fiber tray.

Another aspect of the disclosure is a fiber optic module that includes a body that is transmissive to light having a predetermined wavelength, and a fiber tray. The fiber optic body includes a first surface and a second surface, a total-internal-reflection (TIR) surface extending from the first surface, wherein the TIR surface is operable to reflect an optical signal of light propagating within the body by total internal reflection, a fiber-end datum surface located proximate the TIR surface such that optical signals propagating through the fiber-end datum surface are reflected at the TIR surface, and a plurality of lens surfaces formed on the second surface of the body. The plurality of lens surfaces, the TIR surface, the fiber-end datum surface and intervening portions of the body define a plurality of lenses each having a folded optical axis (i.e., the optical axis turns the optical signal). The body further includes a fiber tray recess configured to receive the fiber tray. The fiber tray includes a plurality of fiber support features disposed on a first surface. The plurality of fiber support features is configured to receive a plurality of optical fibers. The fiber tray is disposed within the fiber tray recess and secured to the body such that fiber-ends of the plurality of optical fibers disposed in the plurality of fiber support features are positioned at the fiber-end datum surface of the body and are substantially aligned with the folded optical axes of the plurality of lenses.

Another aspect of the disclosure is the aforementioned fiber optic module, wherein the fiber tray further includes a first adhesive receiving feature located and a second adhesive receiving feature. The first and second adhesive receiving features are configured to receive an adhesive for securing the fiber tray to the body at the fiber tray recess. The fiber tray further includes an adhesive well extending a depth into the fiber tray from the first surface and across the plurality of fiber support features for securing the plurality of optical fibers disposed within the plurality of fiber support features to the fiber tray.

Another aspect of the disclosure is the aforementioned fiber optic module, wherein the adhesive well is positioned at the first surface.

Another aspect of the disclosure is the aforementioned fiber optic module, wherein the first adhesive receiving feature and the second adhesive receiving feature are located closer to a second edge than a first edge.

Another aspect of the disclosure is the aforementioned fiber optic module, wherein the fiber tray includes a first additional adhesive receiving feature and a second additional adhesive receiving feature.

Another aspect of the disclosure is the aforementioned fiber optic module having a tilting feature for tilting the fiber tray in the fiber tray recess. The one or more tilting features may be disposed on the fiber tray, the body or both. For instance, the fiber tray further includes one or more tilting protrusions extending from the second surface proximate to the first edge such that the fiber tray is tilted toward a floor of the fiber tray recess. However, the tilting feature may be disposed in the recess of the body for tilting the fiber tray recess.

Another aspect of the disclosure is the aforementioned fiber optic module, wherein the body further includes a plurality of fiber support features. The plurality of fiber support features of the body are generally aligned with the plurality of fiber support features of the tray.

Another aspect of the disclosure is an optical-electrical connector including a substrate, a plurality of optical fibers, a fiber optic module having a body and a fiber tray. The substrate includes a surface and a plurality of active optical components coupled to the surface. Each optical fiber of the plurality of optical fibers has a core surrounded by an outer coating, wherein each optical fiber includes a stripped region where the core is exposed for a length from a fiber-end. The body is transmissive to light having a predetermined wavelength, and includes a first surface and a second surface, a total-internal-reflection (TIR) surface extending from the first surface, wherein the TIR surface is operable to reflect an optical signal of light propagating within the body by total internal reflection, and a fiber-end datum surface located proximate the TIR surface such that optical signals propagating through the fiber-end datum surface are reflected at the TIR surface. The body further includes a plurality of fiber support features terminating at the fiber-end datum surface, and a plurality of lens surfaces formed on the second surface of the body, wherein the lens surfaces, the TIR surface, the fiber-end datum surface and intervening portions of the body define a plurality of lenses each having a folded optical axis. The body may also includes a fiber tray recess (i.e., a pocket) for receiving the fiber tray. The body is coupled to the surface of the substrate such that the plurality of lenses is substantially aligned with the plurality of active optical components. The fiber tray includes a first edge and a second edge opposite from the first edge. The plurality of optical fibers is disposed within the fiber tray such that each individual optical fiber extends beyond the second edge by an offset length $L_f$. The fiber tray is disposed within the fiber tray recess and secured to the body such that the stripped region of the plurality of optical fibers are disposed in the plurality of fiber support features, and fiber-ends of the plurality of optical fibers are positioned at the fiber-end datum surface and are substantially aligned with the folded optical axes of the plurality of lenses.

Another aspect of the disclosure is the aforementioned optical-electrical connector, wherein the fiber tray further includes a first surface and a plurality of fiber support features extending from the first edge to the second edge on the first surface, wherein the plurality of optical fibers are disposed within the plurality of fiber support features. The fiber tray further includes a third edge, a fourth edge opposite the third edge, and a first adhesive receiving feature located at the third edge and a second adhesive receiving feature located at the fourth edge. The first and second adhesive receiving features are configured to receive an adhesive to secure the fiber tray to the body at the fiber tray recess. The fiber tray also includes an adhesive well extending a depth into the fiber tray from the first surface and across the plurality of fiber support features. The adhesive well is configured to receive an adhesive to secure the plurality of optical fibers disposed within the plurality of fiber support features to the fiber tray.

Another aspect of the disclosure is the aforementioned optical-electrical connector, wherein the plurality of active optical components includes at least one light source device and at least one photodetector. A lens surface of the plurality of lens surfaces aligned with the at least one light source device is offset from a surface of the at least one light source device by a height $H_S$, and a lens surface of the plurality of lens surfaces aligned with the at least one photodetector is offset from a surface of the at least one photodetector by a height $H_D$, wherein $H_S$ is greater than $H_D$.

Another aspect of the disclosure is a method of processing optical fibers that includes positioning a plurality of optical fibers having a core surrounded by an outer coating in a plurality of fiber support features in a first surface of a fiber tray such that the plurality of optical fibers extend beyond an insertion edge of the fiber tray by an offset length $L_f$, and applying an adhesive at the first surface of the fiber tray to secure the plurality of optical fibers to the fiber tray. The method further includes stripping the outer coating of each optical fiber of the plurality of optical fibers to expose the core, thereby forming a stripped region of each optical fiber, and positioning the fiber tray into a body of the fiber optic module. The body includes a total-internal-reflection (TIR) surface extending from a first surface, a fiber-end datum surface located proximate the TIR surface, and a plurality of fiber support features terminating at the fiber-end datum surface. The fiber tray is inserted into the body such that the stripped regions of the plurality of optical fibers are disposed within the plurality of fiber support features of the body and a fiber-end of each optical fiber is positioned at the fiber-end datum surface. The method further includes applying an adhesive to the fiber tray to secure the fiber tray and the plurality of optical fibers to the body of the fiber optic module.

Another aspect of the disclosure is the aforementioned method, wherein stripping the outer coating of each optical fiber of the plurality of optical fibers is performed by a laser stripping process.

Another aspect of the disclosure is the aforementioned method, further including applying adhesive for securing the fiber tray to the body of the fiber optic module.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various embodiments of the disclosure and together with the description set forth herein serve to explain the principles and operations of the disclosed concepts. The claims are incorporated into and constitute part of the Detailed Description set forth below.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6B is a top view of the body depicted in FIG. 6A;

FIG. 6C is a rear view of the body module depicted in FIGS. 6A and 6B;

FIG. 6D is a cross-sectional view of the body depicted in FIG. 6B taken along line 6D-6D;

Figure 1:
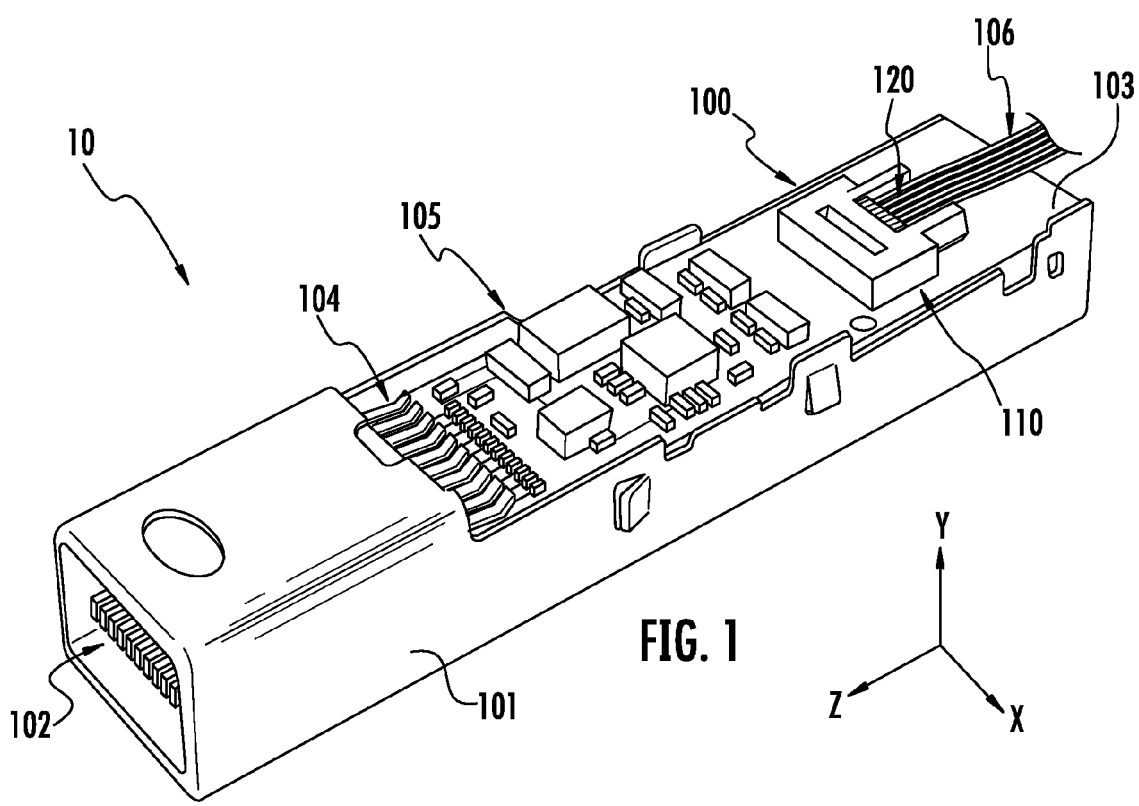
FIG. 1 is a top-down elevated view of an example optical-electrical connector including a fiber optic module with a portion of the housing removed for clarity purposes according to one or more embodiments of the disclosure.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Embodiments of the present disclosure relate to fiber optic modules and optical-electrical connectors and, more particularly, to fiber optic modules and optical-electrical connectors that employ total-internal-reflection ("TIR") to provide optical signals of light between active optical components, such as light source devices (lasers, light emitting diodes, and the like) used for the transmit channel(s), and photodetector devices (e.g., photodiodes) used on the receive channel(s). Embodiments also relate to methods of processing and aligning optical fibers with lenses of a fiber optic module.

Referring generally to the figures, embodiments are directed to two-piece fiber optic module including a fiber tray and a body having a TIR surface. Optical fibers of an optical cable assembly are first inserted into fiber support features (e.g., grooves) of the fiber tray and then further processed (e.g., laser or mechanical stripping one or more coating layers to expose the optical fiber core or cladding and/or cleaving the end of the fiber). The fiber tray is then positioned in the body of the fiber optic module and secured by an adhesive. The fiber ends of the optical fibers extending from the fiber tray are actively positioned within fiber support features (e.g., such as the grooves) of the body (e.g., using passive alignment or active alignment) and secured to the body at the fiber support features with an index-matching adhesive. The fiber ends are aligned and positioned such that they are disposed at (i.e., contact or nearly contact) a reference fiber-end datum surface such that they are aligned with a plurality of lenses defined by the body.

Use of the fiber tray enables simultaneous processing of multiple optical fibers prior to insertion into the body of the fiber optic module, which may reduce fabrication time, cost or both. Further, the fiber tray secures the loose optical fibers at a location close to the fiber ends such that the positioning of the stripped portion of the optical fibers in the fiber support features of the body is quick and easy for manufacturing. Because the body has features for positioning the fiber ends of the optical fibers at the designed locations, only the tolerances of the body need to be tightly controlled; the tolerances of fiber tray dimensions may be more loosely controlled, which may reduce the overall cost of fabricating the two-piece fiber optic module. Various embodiments of fiber optic modules, fiber trays, optical-electrical connector, and methods of processing optical fibers are described in detail below.

Referring now to FIG. 1, an exemplary optical-electrical connector 10 of an active optical cable assembly is depicted. It should be understood that embodiments of the present disclosure are not limited to any connector standard or configuration. Embodiments described herein may be directed to optical-electrical connectors or cable assemblies. The term "optical-electrical" is used to describe the optical-electrical connector because it performs optical-to-electrical and an electrical-to-optical conversions within the connector. In other words, the optical-electrical connector has electrical contacts at the connector interface for connectivity to a device along with active electronics inside for converting the electrical signals to optical signals and vice-versa for transmission along an optical waveguide such as an optical fiber attached to a module of the connector. Exemplary connector types include, but are not limited to, USB 3.0, HDMI, Thunderbolt™ and FireWire®. Generally, active optical cable assemblies convert electrical signals from an electrical device at a first optical-electrical connector into optical signals that are transmitted over one or more optical fibers. A second optical-electrical connector 10 at the opposite end of the active optical cable assembly then receives the optical signals from the one or more optical fibers, converts the optical signals into electrical signals, and transmits the converted electrical signals to another electronic device that is electrically coupled to the mating interface of the second optical-electrical connector 10.

The exemplary optical-electrical connector 10 depicted in FIG. 1 generally includes an outer housing 101 (it is noted that a top portion of the outer housing is not depicted in FIG. 1 to illustrate internal components) that maintains an electric connector 102, a substrate 103 (e.g., a printed circuit board ("PCB") made of a material such as FR-4, for example), various electronic components 105 (e.g., components for receiving electrical signals, driving light source devices, receiving signals from photodiode devices, and the like), conductive elements 104 electrically coupling the electric connector 102 to the circuit defined by the various electronic components 105, a fiber optic module 100 for providing optical signals of light to and from active optical components 140D, 140S (not visible in FIG. 1, see FIGS. 9A and 9B) underneath the fiber optic module 100, and a plurality of optical fibers 106 of an optical cable. Active optical components include devices capable of transmitting and/or receiving light. Light source devices 140S acting as a transmitting active optical component may include, but are not limited to light emitting diodes and laser diodes, such as vertical-cavity surface-emitting lasers ("VCSEL"). Photodetector 140D acting as a receiving active optical component may include photodiode, for example. The various electronic components 105 may be configured as integrated circuits capable of driving the active optical components 140D, 140S, for example. Any number of active optical components 140D, 140S may be utilized, depending on the communication protocol. In the illustrated embodiment, two light source devices 140S and two photodetectors 140D are used, thereby providing four channels.

Figure 2:
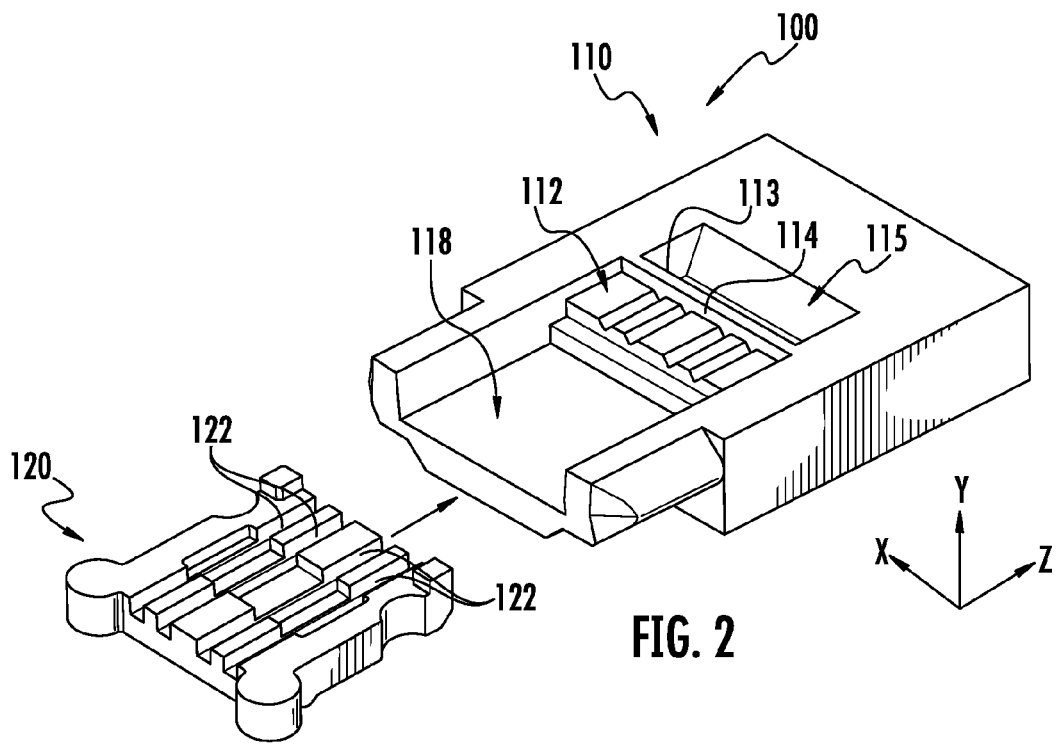
FIG. 2 is a perspective view of a disassembled fiber optic module as shown in FIG. 1.
Figure 3:
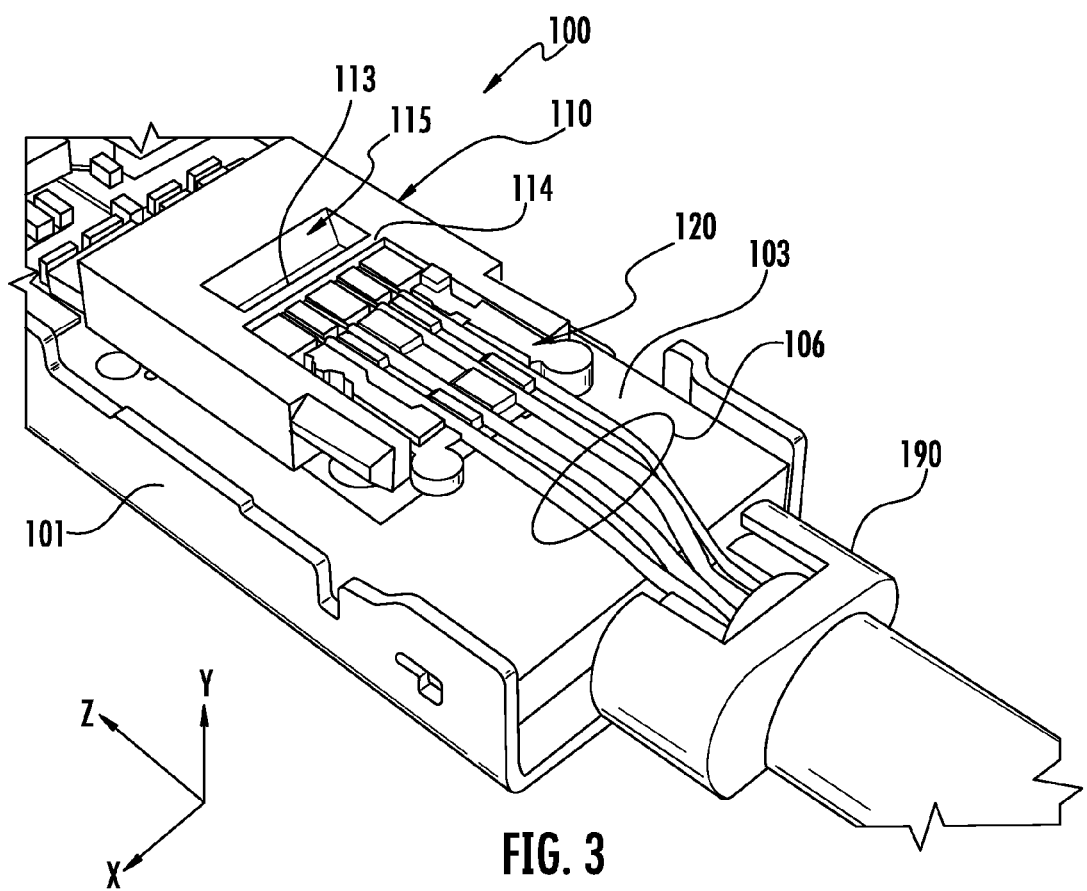
FIG. 3 is a close-up, top-down elevated view of the optical-electrical connector of FIG. 1 showing the fiber optic module with the fiber tray attached to the body.

Generally, the fiber optic module 100 includes a body 110 and a fiber tray 120 that maintains an end portion of the optical fibers 106. In embodiments, the fiber optic module 100 may be provided as a kit of parts for optically coupling optical fibers to active optical components. FIG. 2 is a perspective view of a fiber optic module 100 in a disassembled state, and FIG. 3 is a perspective view of an assembled fiber optic module 100 coupled to a PCB substrate 103 of the optical-electrical connector 10 depicted in FIG. 1. The fiber tray 120 is configured to be disposed and secured into a fiber tray recess 118 of the body 110 such that fiber-ends of the optical fibers 106 that extend from an optional strain relief element 190 are positioned at a fiber-end datum surface 114. The fiber ends of the optical fibers 106 should contact the fiber-end datum surface 114. However, due to variations in fiber length, some of the fiber-ends may nearly contact the fiber-end datum surface 114 and may used an index-matching material as desired. The optical fibers 106 are supported by fiber support features 122 in a top surface of the fiber tray 120. As described in detail below, the body 110 of the fiber optic module includes an angled surface of a recess 115 that acts as a TIR surface 113 to reflect optical signals passing through an intermediate portion of the body extending from the fiber-end datum surface 114 and optical signals emitted by active optical components (not shown) positioned on the PCB substrate 103 beneath the fiber optic module 110. The fiber tray 120 is secured to the body 110 within the fiber tray recess 118 by an adhesive, but could have other types of mechanical attachment. The optical fibers 106 may be secured to the body 110 by an index-matching adhesive after actively positioning the fiber-ends such that they are optically aligned (i.e., in optical communication) with lenses defined by the body 110. In embodiments, the fiber-ends may be aligned with a datum that acts as a surrogate for the position of the lenses.

The body 110 may be precisely located and secured to the PCB substrate 103 to align with the active optic components by any appropriate means. For example, the PCB substrate 103 may include fiducials that are aligned with and configured to fit into alignment features of the body 110 or vice versa; however other alignment methods are possible. For example, a vision system may be used to precisely position the body 110 with respect to the active optical components 140D, 140S on the PCB substrate 103. In embodiments, the body 110 may be fixed in place on PCB substrate 103 using an adhesive, such as epoxy.

Fiber Tray and Optical Fibers

Figure 4A:
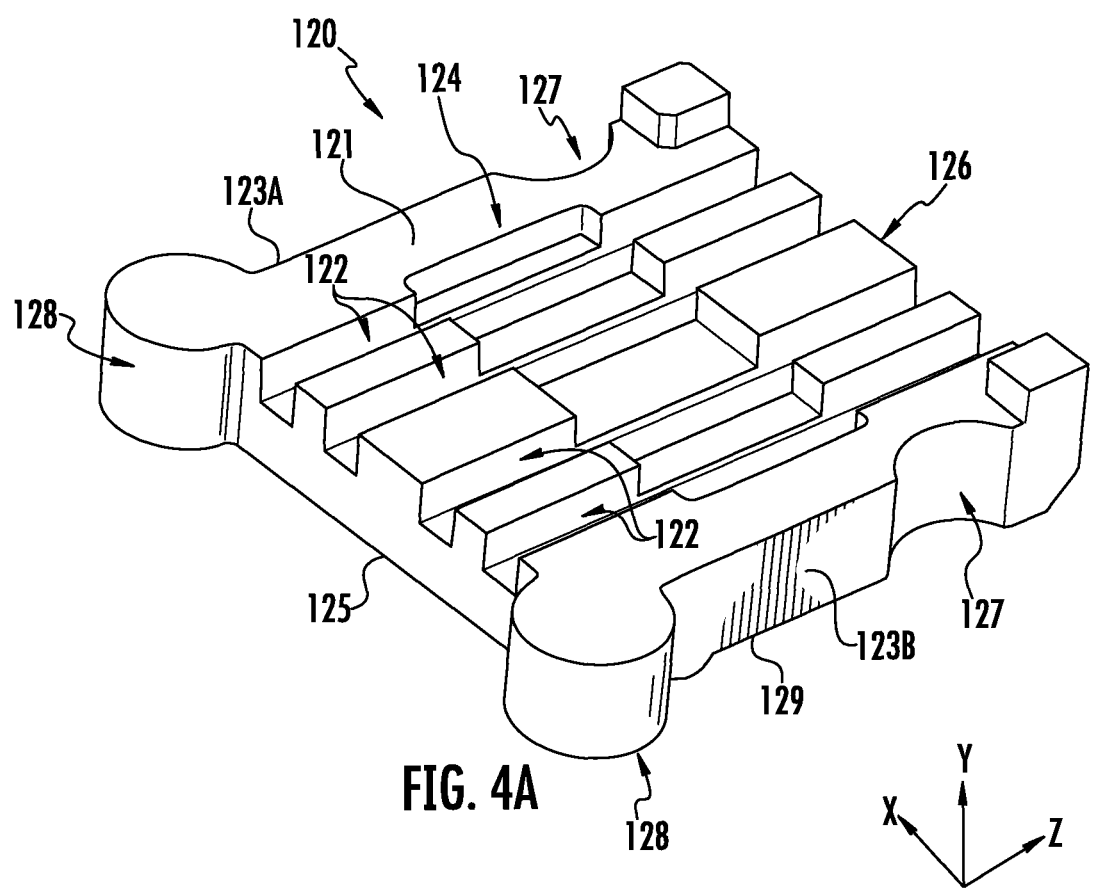
FIG. 4A is a top-down elevated view of a fiber tray of the fiber optic module depicted in FIGS. 1 through 3.
Figure 4B:
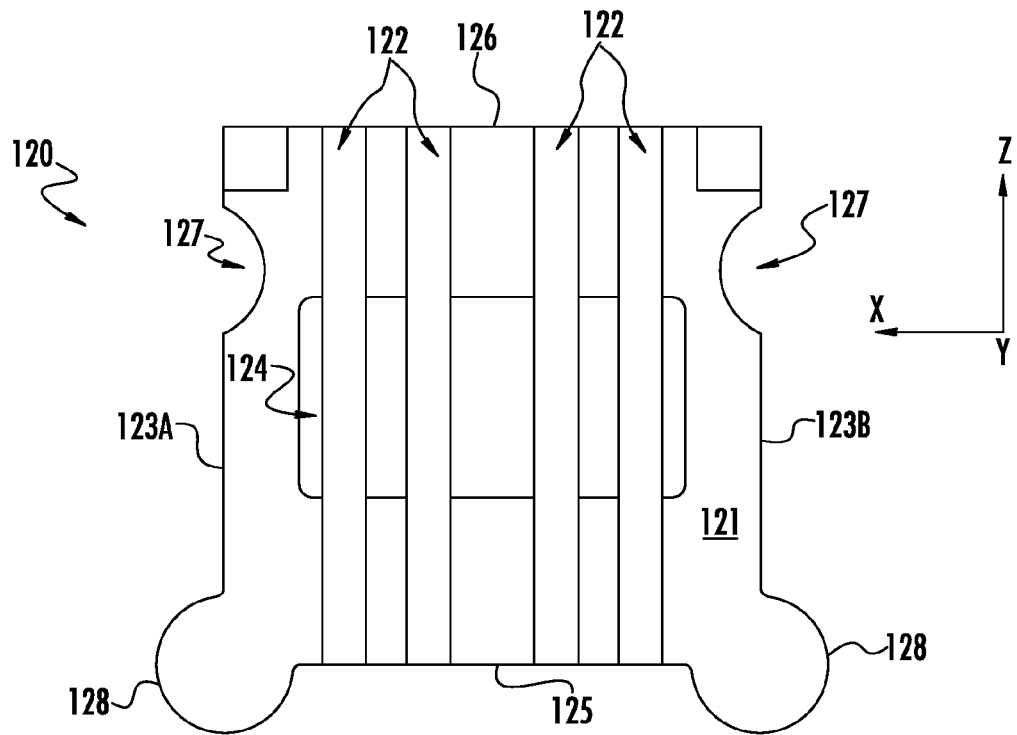
FIG. 4B is a top-down view of the fiber tray depicted in FIG. 4A.
Figure 4C:
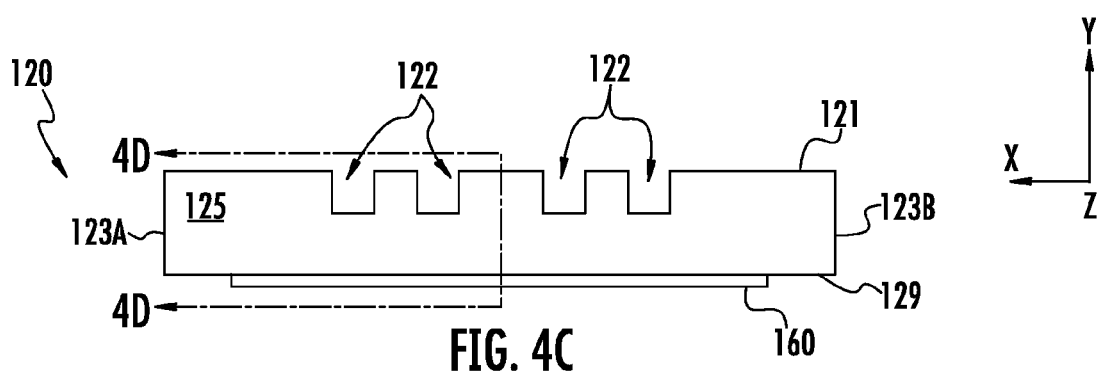
FIG. 4C is a rear view of the fiber tray depicted in FIGS. 4A and 4B.
Figure 4D:
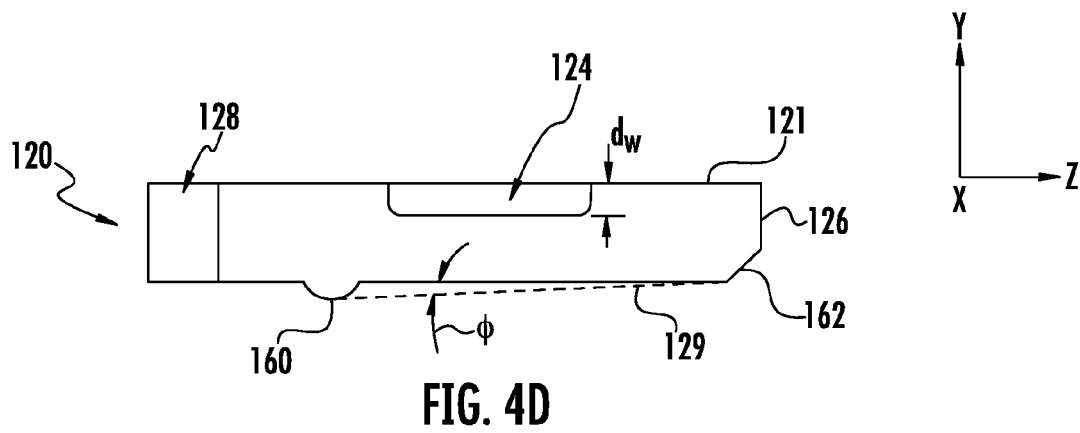
FIG. 4D is a cross-sectional view of another fiber tray similar to that depicted in FIG. 4C taken along line 4D-4D having an optional tilting feature.

Referring now to FIGS. 4A-4D, an exemplary fiber tray 120 is described in detail. FIG. 4A is a top-down elevated view of the exemplary fiber tray 120, while FIG. 4B is a top view of the fiber tray 120, FIG. 4C is a rear view of the fiber tray 120, and FIG. 4D is a cross-sectional view of the fiber tray taken along line 4D-4D in FIG. 4C.

The fiber tray 120 is configured to maintain a plurality of optical fibers 106 prior to insertion into the body 110 and, in some embodiments, prior to processing of the optical fibers 106, such as laser stripping to expose the core of each optical fiber. The fiber tray 120 may be made of any suitable material, such as molded thermoplastic, for example. Exemplary materials include, but are not limited to, LEXAN 940A fabricated by the SABIC innovative Plastics and Udel 3700HC manufactured by Solvay Specialty Polymers. The material chosen may be selected so it transmits ultra-violet ("UV") wavelengths such that UV-cured adhesives may be cured below the fiber tray 120. In embodiments, the features of the fiber tray 120, such as the fiber support features 122 configured as open grooves in this embodiment, may be formed by injection molding using a mold fabricated by wire electrical discharge machining ("EDM"), for example.

The fiber tray 120 depicted in FIGS. 4A-4D generally includes a first surface 121, a second surface 129 opposite from the first surface 121, a first edge 125 defining a rear portion of the fiber tray 120 (i.e., insertion edge), a second edge 126 opposite from the first edge 125, a third edge 123A, and a fourth edge 123B opposite from the third edge 123A. The second edge 126 may optionally include a chamfer 162 for engaging the body 110.

Figure 5A:
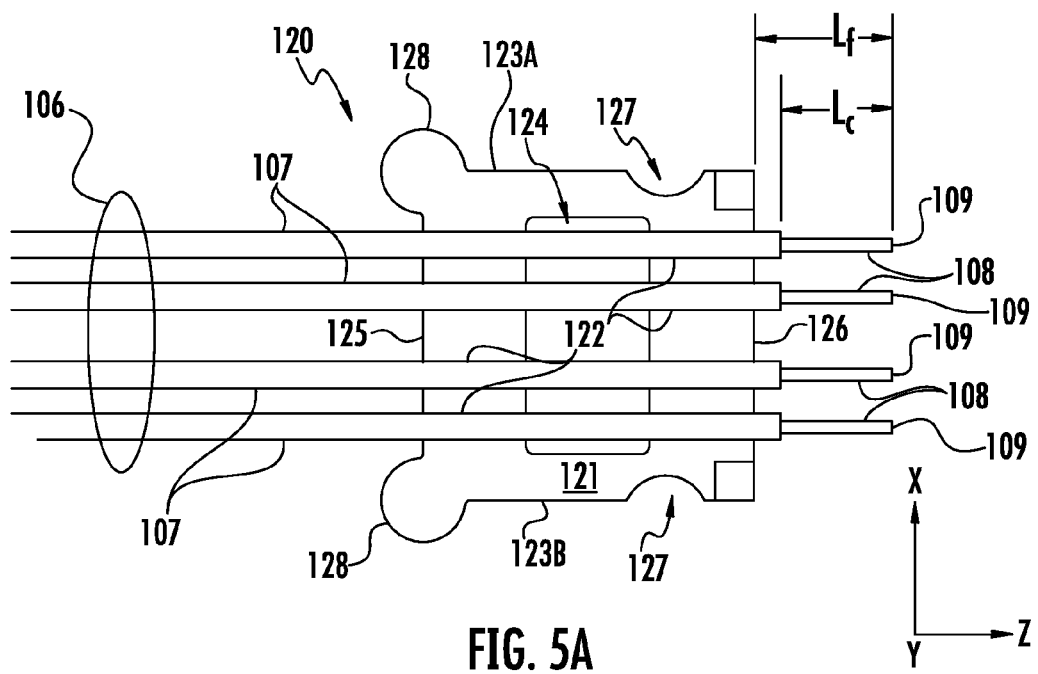
FIG. 5A is a top view of the fiber tray depicted in FIGS. 4A-4D populated with optical fibers.
Figure 5B:
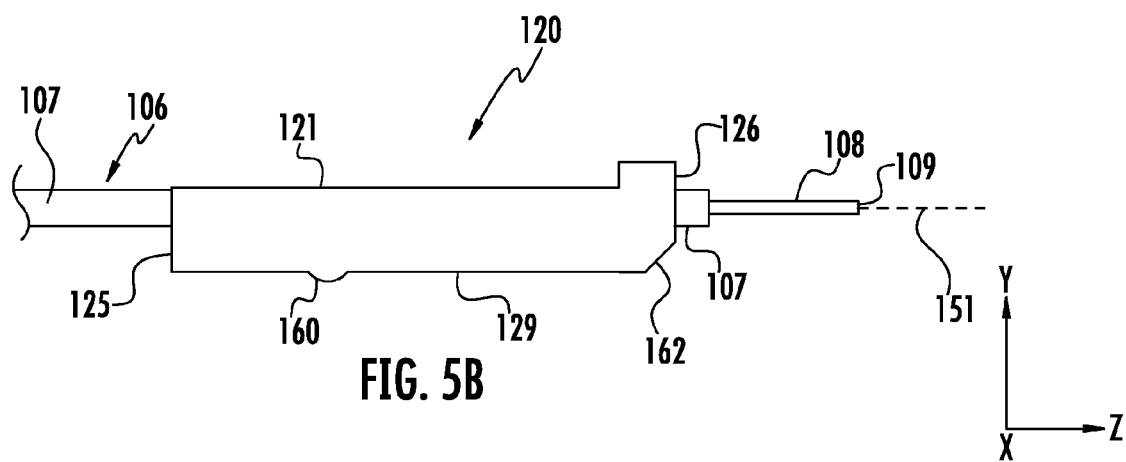
FIG. 5B is a side view of the populated fiber tray depicted in FIG. 5A.

A plurality of fiber support features 122 configured as grooves extend from the first edge 125 to the second edge 126 on the first surface 121 of the fiber tray 120. The fiber support features 122 are configured to receive a non-stripped portion (i.e., "coated") of the plurality of optical fibers 106, as shown in FIGS. 5A and 5B. Although the fiber support features 122 are illustrated as rectangular grooves in FIGS. 4A-4C, embodiments are not limited thereto. For example, the grooves may be configured as "V" shaped grooves (i.e., shaped as the letter "V" when viewed in cross section) or "U" shaped grooves (i.e., shaped as the letter "U" when viewed in cross section).

Referring to FIGS. 5A and 5B, four optical fibers 106 disposed within four fiber support features 122 configured as grooves are illustrated, but any suitable support features may be used for the optical fibers. An example optical fiber 106 is a multi-mode optical fiber, such as, for example, a large-core, high-numerical-aperture optical fiber, e.g., the VSDN™ optical fiber, available from Corning Incorporated of Corning, N.Y. Example optical fibers 106 are also discussed in published PCT Patent Application Publication No. WO2010036684, entitled "High numerical aperture multimode optical fiber," which is incorporated by reference herein. Each optical fiber 106 has a central core 108 ("core") having an index of refraction $n_C$. The core 108 that is surrounded by a cladding (not shown) having an index of refraction $n_{CL}$, where $n_{CL}<n_C$. In an example, the optical fiber 106 has a numerical aperture $NA_F=0.29$. Also in an example, the core 108 has a gradient-index profile, which in an example is a parabolic profile. In an example, the core 108 has a diameter of about 80 microns. The core 108 and cladding of each optical fiber 106 is surrounded by a coating 107. The coating 107 may be an acrylate material, for example. The fiber support features 122 of the fiber tray 120 are dimensioned to accept the coated portion 107 of the optical fibers 106. The core 108 has a central axis 151 as depicted in FIG. 5B.

As shown in FIG. 5A, the optical fibers 106 are disposed within the fiber support features 122 such that they extend beyond the second edge 126. Each optical fiber 106 is stripped to expose the core 108 (or cladding), and then cleaved substantially perpendicular to the fiber axis such that each optical fiber 106 extends beyond the second edge 126 of the fiber tray 120 by a length $L_f$. As an example and not a limitation, the optical fibers 106 may be stripped of the coating 107 by a laser stripping process wherein a laser is utilized to remove the coating material. As an example and not a limitation, a laser source may be used to remove the coating 107, such as the laser stripping process offered by OpTek Systems of Abingdon, UK, for example. Other laser stripping methods may also be utilized. Additionally, non-laser stripping methods may be used to strip the coating material, such as chemical, mechanical or hot gas stripping. The stripped optical fiber 106 may be cleaved by laser cleaving or mechanical cleaving, for example. In some embodiments, the optical fibers 106 are not cleaved after being disposed in the fiber tray 120. An exemplary laser cleaving system includes, but is not limited to, laser cleaving systems offered by OpTek Systems of Abingdon, UK.

A stripped portion of a length $L_c$ of each optical fiber 106 is measured from the end of the coating 107 to a fiber end 109. The length $L_f$ after cleaving should be such that the fiber ends 109 of the optical fibers reach the fiber-end datum surface 114, as described in detail below. The length $L_c$ should be equal to or greater than a length of fiber support features 112 of the body 110 (see FIG. 6A). In embodiments, the optical fibers 106 may be stripped of the coating 107 by a stripping process after being secured to the fiber tray 120 such that multiple optical fibers may be processed in a linear array.

Referring generally to FIGS. 4A-4D, and 5A, the illustrated fiber tray 120 further includes an adhesive well 124 extending a depth $d_w$ into a bulk of the fiber tray 120 from the first surface 121. The adhesive well 124 may be provided to receive an adhesive, such as a curable epoxy, for example, to secure the optical fibers 106 within the fiber support features 122 of the fiber tray 120. Accordingly, the adhesive well 124 is configured as a repository for adhesive. Adhesive applied to the adhesive well 124 may wick along the fiber support features 122 and the coatings 107 of the optical fibers 106. An exemplary UV curing index matched adhesive may include, but is not limited to, Nextgen UV AB14 manufactured by Nextgen Adhesives. Other UV curing index matched adhesives may be used. Although the adhesive well 124 is depicted as being centrally disposed within the first surface 121 of the fiber tray 120, embodiments are not limited thereto. Additionally, the adhesive well 124 may also be configured as more than one well within the first surface 121 of the fiber tray 120 in other embodiments.

Figure 6A:
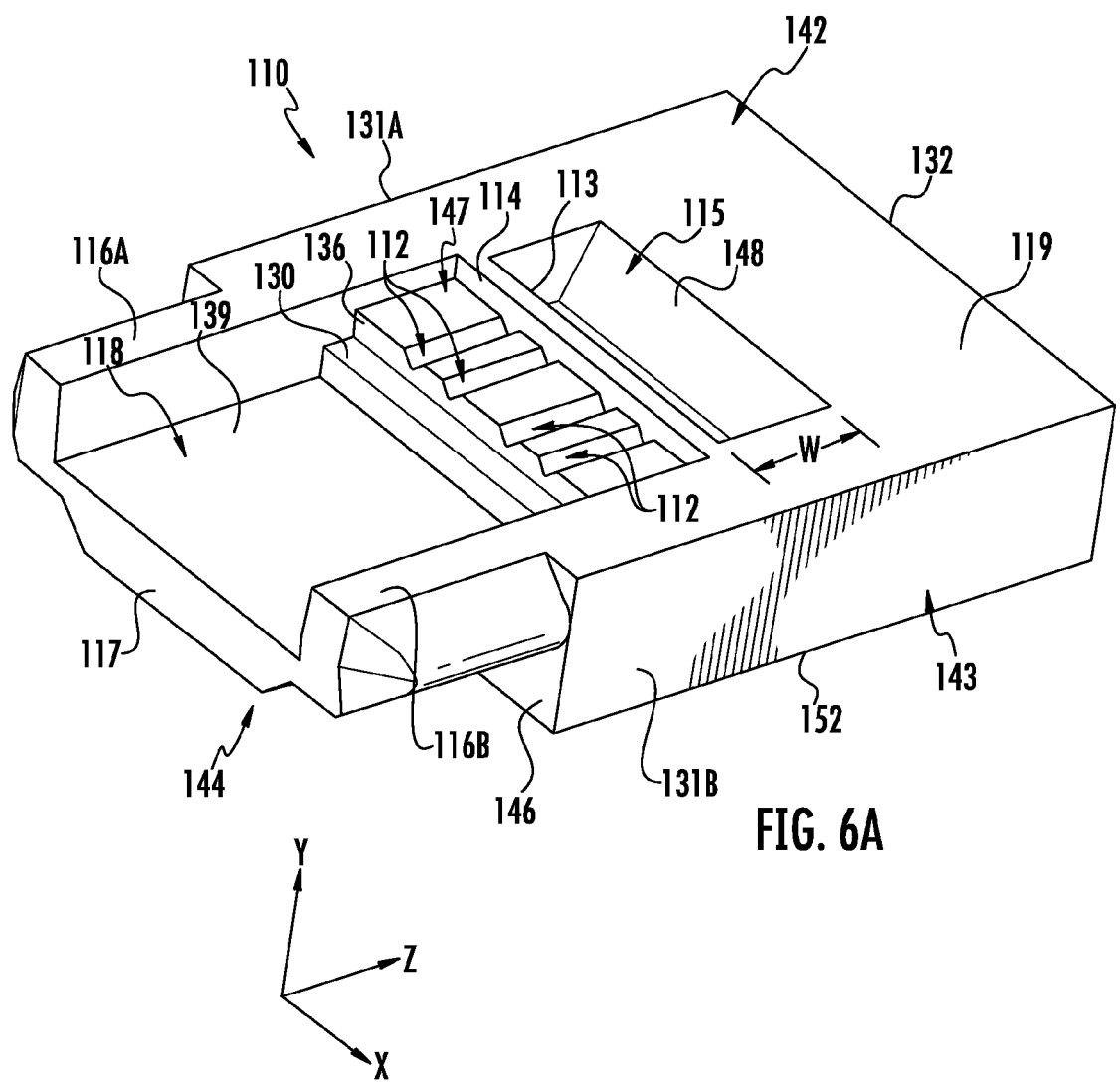
FIG. 6A is a top-down elevation view of the body of the fiber optic module depicted in FIGS. 1 through 3.

The fiber tray 120 may also include adhesive receiving features 127 for securing the fiber tray 120 to the fiber tray recess 118 of the body 110 (see FIG. 6A). The adhesive receiving features 127, which in the illustrated embodiment are configured as notches located on the third and fourth edges 123A, 123B of the fiber tray, provide receptacles to receive an adhesive (e.g., a curable index-matching epoxy matching the fiber end 109 to the material of the body 110). In this case, the notches are arcuate, but they may have any suitable shape such as angular, rectangular, square, etc. The adhesive receiving features 127 allow for the adhesive to wick under the fiber tray 120 such that the fiber tray 120 may be bonded to a floor 139 of the fiber tray recess 118 of body 110. It should be understood that more than two adhesive receiving features 127 (i.e., additional adhesive receiving features) may be provided, and at locations other than those depicted in the figures are possible. In alternative embodiments, the adhesive receiving features may be configured as through-holes extending from the first surface 121 to the second surface 129 of the fiber tray 120, thereby allowing adhesive to flow between the fiber tray 120 and the fiber tray recess 118 of the body 110. Other embodiments using the concepts disclosed may forgo the use of adhesive receiving features. For instance, adhesive may be disposed between the components or use a mechanical attach between the fiber tray and body such as a tongue and groove.

Referring to FIG. 4D (as well as to FIGS. 4C and 5B) the fiber optic module may optionally include a tilting feature for angling the fiber tray from the horizontal plane. For instance, the fiber tray 120 may optionally include one or more tilting protrusions 160 extending from the second surface 129 near the first edge 125 to tilt the fiber tray 120 downward by a tilt angle φ toward the second edge 126 and the interface between fiber support features 112 and fiber-end datum surface 114 of the body 110 when the fiber tray 120 is positioned in the fiber tray recess 118 (see FIG. 7, introduced below). The title angle φ should be such that the optical fibers 106 extending beyond the second edge 126 of the fiber tray 120 are encouraged to be disposed within the fiber support features 112 of the body 110, and therefore be pre-aligned with the lenses (described below) of the body 110 prior to active alignment. In other embodiments, no tilting protrusions are provided such that the entire second surface 129 (i.e., bottom surface) of the fiber tray 120 contacts the floor 139 of the fiber tray recess 118 of the body 110. In other embodiments, the tilting feature such as the tilting protrusions may be disposed on the fiber tray recess of the body or both the fiber tray and body; instead of solely on the fiber tray.

In some embodiments, the fiber tray 120 may also include optional handling features 128 to ease the handling (by human or a machine) of the fiber tray 120, such as when inserting the fiber tray 120 into the fiber tray recess 118 and aligning the fiber ends 109 of the optical fibers into the fiber support features 112. Further, the fiber tray may have other suitable shapes that are complimentary to the fiber tray recess other than the shapes illustrated.

Body of the Fiber Optic Module

Figure 6E:
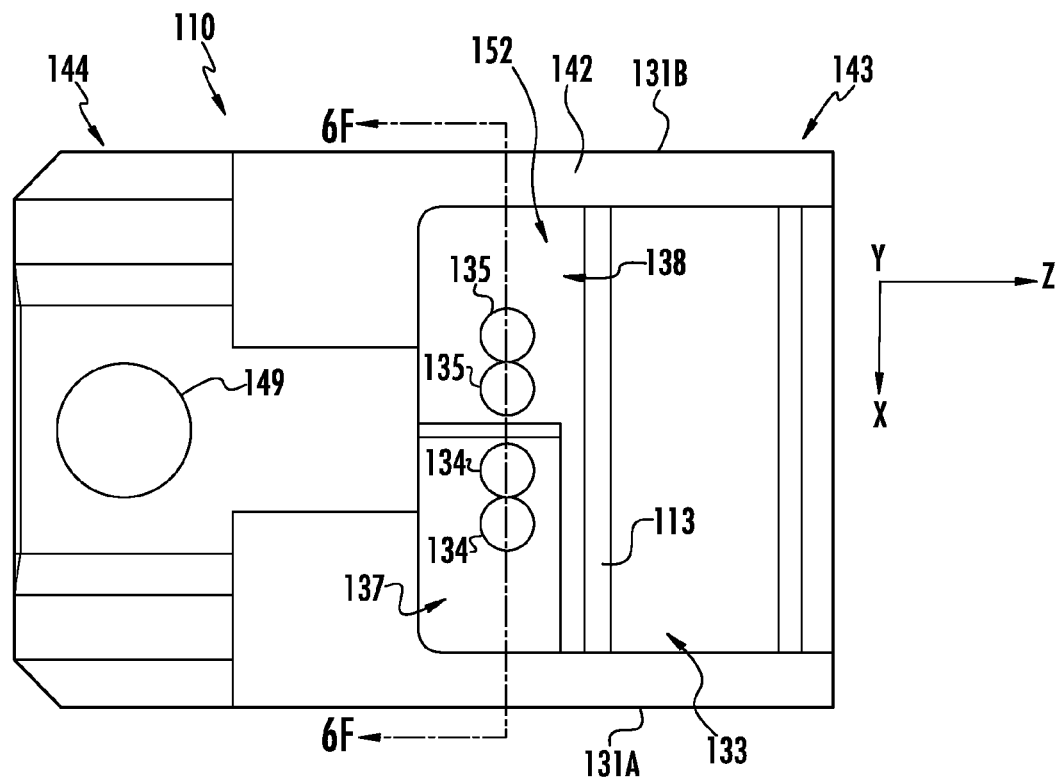
FIG. 6E is a bottom-up view of the body of the depicted in FIGS. 6A-6D.
Figure 6F:
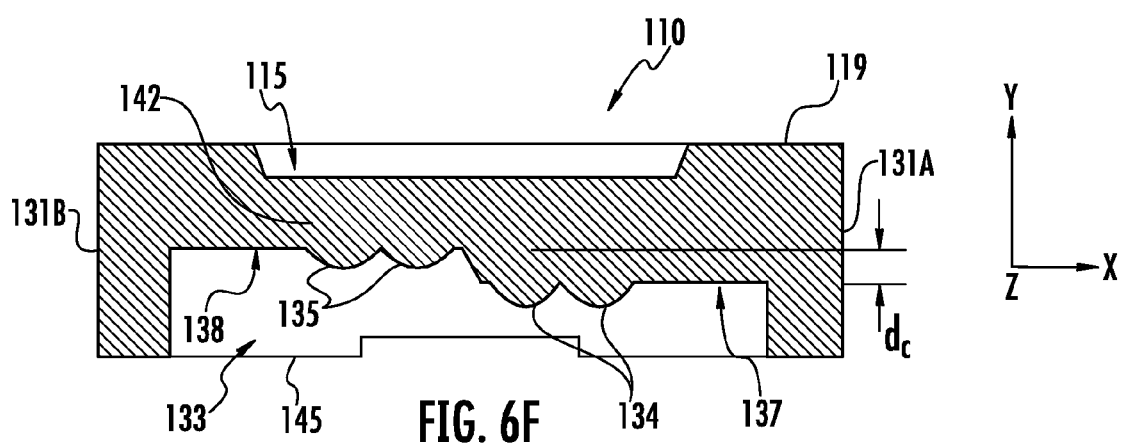
FIG. 6F is a cross-sectional view of the body depicted in FIG. 6E taken along line 6F-6F.

Referring to FIGS. 6A-6F, an exemplary body 110 of a fiber optic module configured to receive the fiber tray 120 depicted in FIGS. 4A-5B is illustrated. FIG. 6A is a top-down elevated view of an exemplary body 110, while FIG. 6B is a top view of the body 110, FIG. 6C is a rear view of the body 110, and FIG. 6D is a cross-sectional view of the body 110 taken along line 6D-6D of FIG. 6B. FIG. 6E is a bottom view of the body 110, while FIG. 6F is a cross-sectional view taken along line 6F-6F of FIG. 6E.

Generally, the body 110 of the fiber optic module is configured to redirect and focus optical signals of light emitted from the fiber ends 109 of the optical fibers 106 onto a photodetector 140D, and redirect and focus optical signals of light emitted by light source devices 140S into the optical fibers 106. The module 100 has a body 110 that, in the illustrated embodiment, defines a rectangular parallelepiped shape TIR portion 143 and a fiber tray insertion portion 144 extending from a front surface 146 of the TIR portion 143. However, other simpler geometric shapes may define the body such as a rectangular body.

The body 110 is made of a material that is transmissive to light having a predetermined wavelength λ according to the particular optical communication protocol, such as an infrared (IR) wavelength λ in the range of 800 nm to 1,100 nm, which is the wavelength range of VCSELs used in forming optical data links. As used herein, transmissive means that optical signals are able to pass through the material without significant losses. Other predetermined wavelengths λ may be used, such as wavelengths in the visible spectrum, for example.

In an example embodiment, the body 110 of the fiber optic module 100 is formed from a transparent resin such as Polyetherimide (PEI) sold by the General Electric Company under the trademarked name ULTEM® 1010, which has a refractive index of about n=1.64 in the aforementioned IR wavelength range. In an example, the body 110 is monolithic and is formed, for example, by molding, by machining or by a combination of both molding and machining. In an example, the mold is made of steel and is precision micro-machined so that the features of body, including lens surfaces 134, 135 described below, are formed with high precision to provide fine optical alignment between fiber ends 109 and active optical components.

The body 110 has a first end 117 at the insertion portion 144, a front surface 146 of the TIR portion 143, a second end 132 that may be substantially parallel to the front surface 146, a first surface 119, and a second surface 145 that may be substantially parallel to the first surface 119. The TIR portion 143 of the body 110 also includes two sides 131A, 131B. The example insertion portion 144 includes two arms 116A, 116B and a floor 139 that define the fiber tray recess 118 into which the fiber tray 120 is disposed. In alternative embodiments, the body 110 does not include an insertion portion 144 as depicted in FIGS. 6A-6F, but rather the body 110 is configured as a unitary, rectangular parallelepiped shape (e.g., the front face 146 is located at the first end 117).

The fiber tray recess 118 extends into the TIR portion 143 and, in the illustrated embodiment, the floor 139 of the fiber tray recess 118 terminates at a ledge 130 that may be configured to engage the chamfer 162 of the fiber tray 120 when the fiber tray 120 is disposed in the fiber tray recess 118. The ledge 130 transitions into a fiber support ledge 147 having a height that is greater than a height of the ledge 130. The fiber support ledge 147 defines a wall 136. Alternatively, the floor 139 may terminate directly at the fiber support ledge 147 rather than the intermediate ledge 130.

The fiber support ledge 147 includes fiber support features 112 configured as "V" shaped grooves in the illustrated embodiment. The fiber support features 112 may be configured as rectangular grooves, or "U" shaped grooves, for example. Alternatively, the fiber support features 112 may also be configured as bores dimensioned to receive the stripped portion of the optical fibers 106. The fiber support features 112 run in the Z-direction at a length $L_g$, and may be generally parallel to first and second sides 131A, 131B if desired. In some embodiments, the fiber support features 112 terminate at a fiber-end datum surface 114 that is substantially orthogonal to the fiber support features 112 and extends toward the first surface 119, and are open at an opposite end of the fiber support ledge 147. In other embodiments, the fiber-end datum surface 114 is slightly angled (e.g., 5 degrees) with respect to a plane that is orthogonal to the fiber support features 112 for manufacturing purposes (e.g., to prevent the mold from scuffing the fiber-end datum surface 114 when the mold opens during the fabrication process). The fiber support features 112 are configured to be aligned with the fiber support features 122 of the fiber tray 120 when the fiber tray 120 is disposed in the fiber tray recess 118. Further, as described in more detail below, each module fiber support feature 112 is aligned with a lens axis of each lens to properly locate the fiber axis of the optical fibers 106 with the corresponding lens axis of the lenses.

The first surface 119 also includes a recess 115 that is offset from the fiber-end datum surface 114. The recess 115 includes a front angled wall 113 that defines a TIR surface 113 as described below, and a rear wall 148 that may be angled or, alternatively, substantially vertical. The angled wall 113 faces the fiber-end datum surface 114 and slopes away from the fiber-end datum surface 114 at an angle θ (see FIGS. 9A and 9B). In an example, the angled wall 113 has a nominal angle θ=45° relative to the Y-direction.

The fiber-end datum surface 114 accordingly acts as a mechanical stop for the fiber ends 109 of the optical fibers 106 that establishes the longitudinal position (i.e., the Z-directional position) of optical fibers 106 supported by the fiber support features 112.

The recess 115 and corresponding angled wall 113 provide an air-body interface that allows for the angled wall 113 to serve as a substantially 90° TIR mirror for reflecting optical signals of light as described in detail below. The angled wall 113 is referred to hereinafter as TIR surface 113. The material of the body 110 has a refractive index n sufficiently large to provide nominally 90° total-internal reflection at the TIR surface 113. Simply stated, the TIR surface 113 provides an interface between the material of the angled wall 113 and air having different indices of refraction for turning the optical signal within the module 110.

As best seen in FIGS. 6D-6F (as well as FIGS. 9A and 9B, introduced below), the body 110 of the module 100 defines a recess 133 that is formed in a bottom surface 152 and adjacent the second end 132. Active optical components secured to the PCB substrate 103 or intermediate IC chip are disposed within the recess 133 when the module 110 is secured to the PCB substrate 103. In the illustrated embodiment, the recess 133 defines a first ceiling portion 137 and a second ceiling portion 138 that is offset from the first ceiling portion 137 by a distance $d_c$ (FIG. 6F) As described below, the offset distance $d_c$ between the first ceiling portion 137 and the second ceiling portion 138 is provided to accommodate the fact that the optical path for an optical signal received by a photodiode device 140D is different (i.e., optically tuned differently) from an optical path for an optical signal emitted by a light source device 140S.

The first ceiling portion 137 includes one or more lens surfaces 134 configured to focus an optical signal onto a photodetector 140D, while the second ceiling portion 138 includes one or more lens surfaces 135 configured to receive an optical signal from a light source device 140S and focus said optical signal into an optical fiber 106. The lens surfaces 134, 135 define, along with the TIR surface 113 and the fiber-end datum surface 114, corresponding lenses 164 (for focusing optical signals onto a photodiode device 140D), and corresponding lenses 165 (for focusing optical signals into an optical fiber 106), each having a folded lens axis 153. The folded lens axis 153 passes through a lens surface 134, 135 and fiber-end datum surface 114 at substantially right angles thereto.

The lens surfaces 134, 135 and the associated folded lens axes 153 are aligned with the corresponding fiber support features 112 along the Z-direction, with one lens surface for each optical fiber support feature, and thus one lens surface for each optical fiber 106 supported therein.

In an example, the portion of folded lens axis 153 that runs in the Z-direction coincides with the optical fiber central axis 151 when the corresponding optical fiber 106 is disposed in the corresponding module fiber support feature 112. Thus, the fiber support features 112 are configured so that the central axis 151 of the optical fiber and the folded lens axis 153 intersect substantially at right angles and substantially at the TIR surface 113 (best shown in FIG. 6D and FIGS. 9A and 9B). The folded lens axis 153 defines a section of a folded light-source ("source") optical path $OP_S$ or a folded photodetector ("detector") optical path $OP_D$, wherein a portion of each optical path resides within module body 110, as discussed below and illustrated in FIGS. 9A and 9B.

The lens surfaces 134, 135, the TIR surface 113, the corresponding portion of the fiber-end datum surface 114 and the corresponding portion of body 110 therebetween define lenses 164, 165 having a folded optical axis 153. The lens surfaces 134, 135 can be considered a "front" lens surface and the fiber-end datum surface 114 can be considered a "rear" lens surface. The corresponding portion of the body 110 includes the lens body. The axial distance between the front and rear lens surfaces is the lens thickness, i.e., the thickness of the lens body. It is noted that a feature 149 (FIG. 6E) may be provided as an ejector pin or structure for the mold during the fabrication process. Such an ejector pin may also be used as an alignment fiducial for aligning the body 110 with the active optical components and the PCB substrate 103.

In an example, lens surfaces 134 are formed integrally on the first ceiling portion 137 and lens surfaces 135 on the second ceiling portion 138 (i.e., the lens surfaces 134, 135 are integral with body 110 and so constitute a curved portion of body 110. In another example, the lens surfaces 134, 135 are added to the first and second ceiling portions 137, 138. The lens surfaces 134, 135 each have a diameter or clear aperture CA. In an example, the lens surfaces 134, 135 each have a clear aperture CA of between 250 microns and 600 microns, and in a more specific example about 500 microns, but other suitable sizes are possible. Single point diamond turning ("SPDT") may be used to form the precision components of the mold, such as the fiber support features and the lens surfaces 134, 135. However, wire EDM or other processes may also be used to form these components.

Figure 9A:
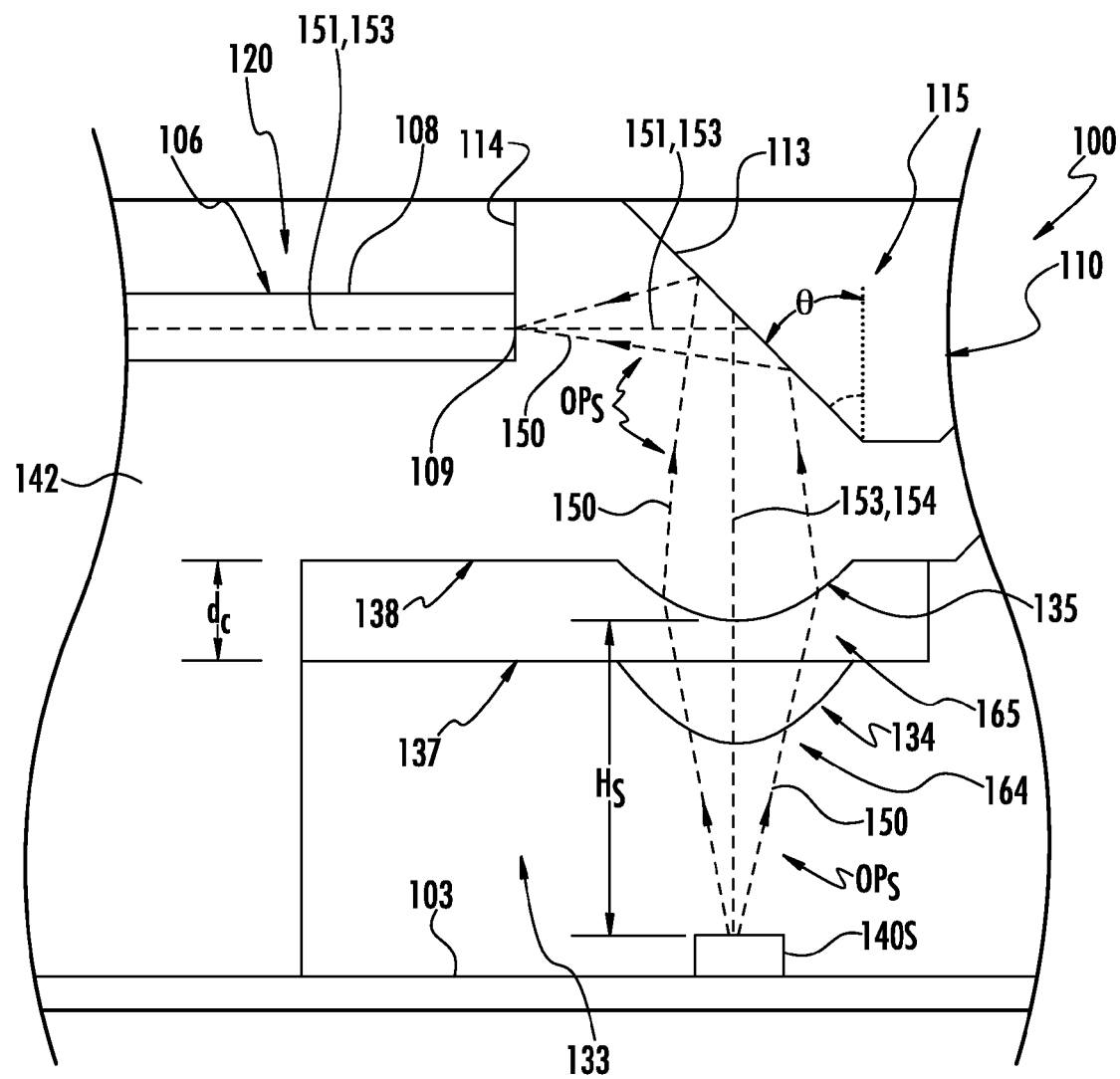
FIG. 9A is a close-up cross-sectional view depicting a printed circuit board ("PCB") substrate (or IC chip) and the active optical component as a light source device, and also depicting the light from the light source device traveling over a folded source optical path through the body of the fiber optic module to a focus that resides within the optical fiber.
Figure 9B:
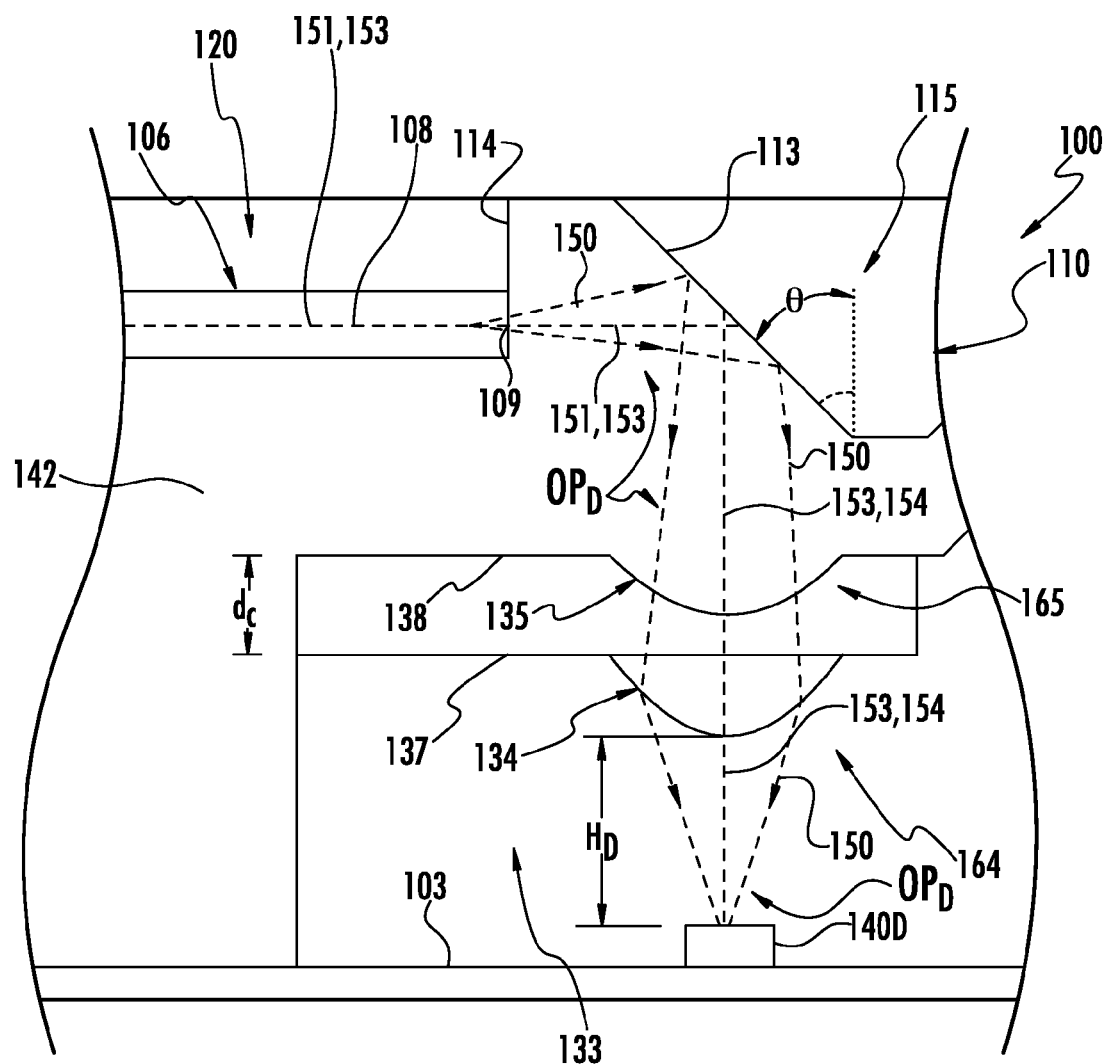
FIG. 9B is a close-up cross-sectional sectional view depicting light traveling in the optical fiber in the opposite direction of FIG. 9A, over a folded detector optical path from the optical fiber and through the body of the fiber optic module to an active optical component in the form of a photodetector supported by the PCB substrate (or IC chip).

It is noted here that while lenses 164, 165 can be the same, the (at least one) source optical path $OP_S$ and the (at least one) detector optical path $OP_D$ are typically are not identical. Referring to FIGS. 9A and 9B, this is because light 150 leaving optical fiber end 109 will typically have a different divergence (numerical aperture) than the light source device 140S. Accordingly, the source and detector optical paths $OP_S$ and $OP_D$ are typically not reverse optical paths. In the illustrated embodiment the first ceiling portion 137 and the second ceiling portion 138 are offset with respect to one other to therefore offset lens surfaces 134 and 135 to accommodate the difference in source optical path $OP_S$ and detector optical path $OP_D$. In alternative embodiments, the lens surfaces 134 and 135 may not be offset with respect to one another and the individual lenses configured to accommodate for the difference in source optical path $OP_S$ and detector optical path $OP_D$.

Figure 7:
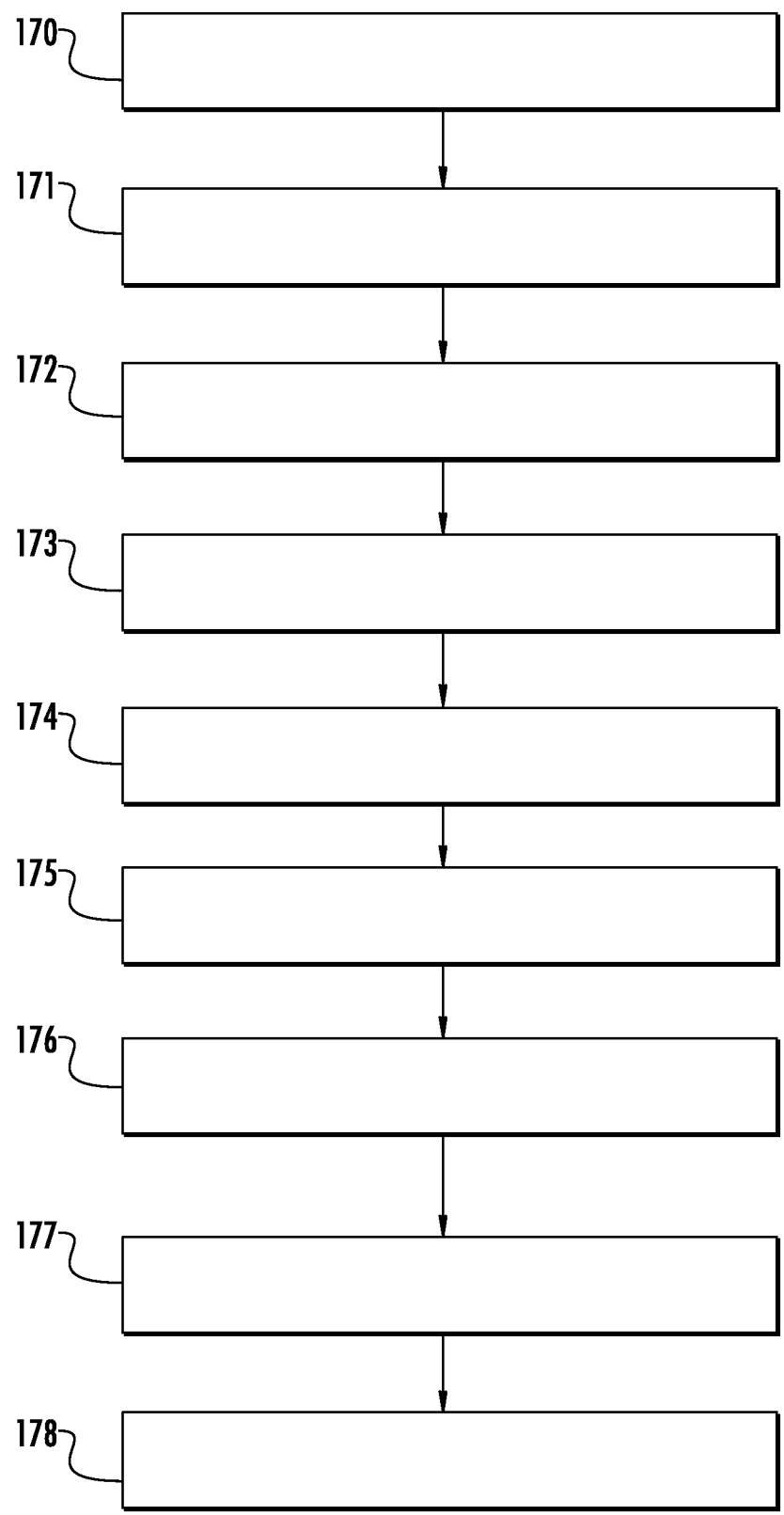
FIG. 7 is a flowchart describing an example optical fiber processing method according to one or more embodiments of the disclosure.

Processing Optical Fibers and Installation of the Fiber Tray and Optical Fibers Into the Body of the Fiber Optic Module Referring now to FIG. 7, a flowchart of an example method of processing optical fibers 106 is provided. At block 170, a plurality of optical fibers 106 are inserted into the fiber support features 122 within a first surface 121 of the fiber tray 120, as shown in FIGS. 5A and 5B. The fiber ends 109 of the optical fibers extend beyond the second edge 126 by an offset length that is equal to or greater than a length $L_g$ of the fiber support features 112 on the body 110. As an example and not a limitation, a fixture or automation device may be utilized to accurately position the plurality of optical fibers 106 in the fiber tray 120. At block 171, the length $L_f$ of the portion of the optical fibers 106 that extend beyond the second edge 126 may be verified (e.g., by an appropriate measurement system) in embodiments wherein the optical fibers 106 are not cleaved to the desired length $L_f$.

After the optical fibers 106 are properly positioned within the fiber tray 120, an adhesive, such as a curable epoxy, for example, is applied to the adhesive well 124. The adhesive flows throughout the adhesive well 124 and into the fiber support features 122. Thus, the adhesive secures the optical fibers 106 to the fiber tray 120 (block 172).

Securing the plurality of optical fibers 106 to the fiber tray 120 in such a manner allows for multiple optical fibers 106 to be stripped of their coating layers 107 simultaneously because they are not loose (i.e., they are manageable and maintained in a known, desired arrangement). At block 173, the coating 107 of each optical fiber 106 is removed by a laser stripping process to expose the core 108 (or cladding), thereby forming a stripped portion having a length $L_c$ that is equal to or greater than the length $L_g$ of the fiber support features 112 on the body 110. Additionally, in some embodiments, the optical fibers 106 are cleaved such that they extend beyond a second edge 126 of the fiber tray 120 by a length $L_f$ (block 174). Any stripping system may be utilized to remove the coating 107 and any other layers of the optical fibers 106 that surround the core 108. Further, any cleaving method may be used to cleave the optical fibers 106 to the proper length. As an example and not a limitation, an exemplary laser stripping process and laser cleaving process includes the optical fiber laser stripping and cleaving systems offered by OpTek Systems of Abingdon, UK. It is noted that stripping processes other than laser stripping processes may be used to remove the coating 107, such as chemical, mechanical or hot gas stripping. Additionally, mechanical cleaving methods may be used to cleave the optical fibers 106 rather than laser cleaving in some embodiments.

At block 175, the fiber tray 120, along with the stripped optical fibers 106, is positioned within the fiber tray recess 118 of the body 110. The fiber tray recess 118 is dimensioned to accommodate the fiber tray 120. In the illustrated embodiment, the fiber tray 120 is inserted into the fiber tray recess 118 in the Z-direction. As an example and not a limitation, a vacuum micro-manipulator may be coupled to handling features 128 of the fiber tray 120 to position the fiber tray 120 in the fiber tray recess 118.

At block 176, the stripped portion of exposed core 108 of each optical fiber 106 is positioned in their respective fiber support feature 122 and contacts (or nearly contacts) the fiber-end datum surface 114 by using an active alignment process. The tolerances of the body 110 are tightly controlled such that the interface of the fiber support features 112 and the fiber-end datum surface 114 provides an accurate location for the fiber end 109 of each optical fiber 106 such that the central axis 151 of each core 108 is substantially aligned with the folded lens axis 153 of the corresponding lens 164, 165 provided by the body 110 (see FIGS. 9A and 9B). The active alignment process may utilize a microscope to assist in fully disposing the optical fibers 106 into the respective module fiber support feature 112 such that the optical fibers 106 are substantially orthogonal to, and the fiber ends 109 are positioned at, the fiber-end datum surface 114. The fiber ends 109 may be substantially in contact with the fiber-end datum surface 114. In some embodiments, an X-Y-Z indexing machine (not shown) may be utilized to assist in properly locating the fiber tray 120 in the fiber tray recess 118 such that the fiber ends 109 are in the correct positions. For example, the X-Y-Z indexing machine may allow incremental movements of the fiber tray 120 and/or the body 110 in the X, Y, and Z directions for proper alignment.

At block 177 the location of the fiber ends 109 of the optical fibers 106 in the fiber support features 112 is verified. For example, the location of the fiber ends 109 may be verified visually using a microscope. Alternatively, the location of the fiber ends 109 may be actively verified by sending and receiving optical signals through the lenses 164, 165 defined by body 110, and confirming receipt of such optical signals.

Figure 8:
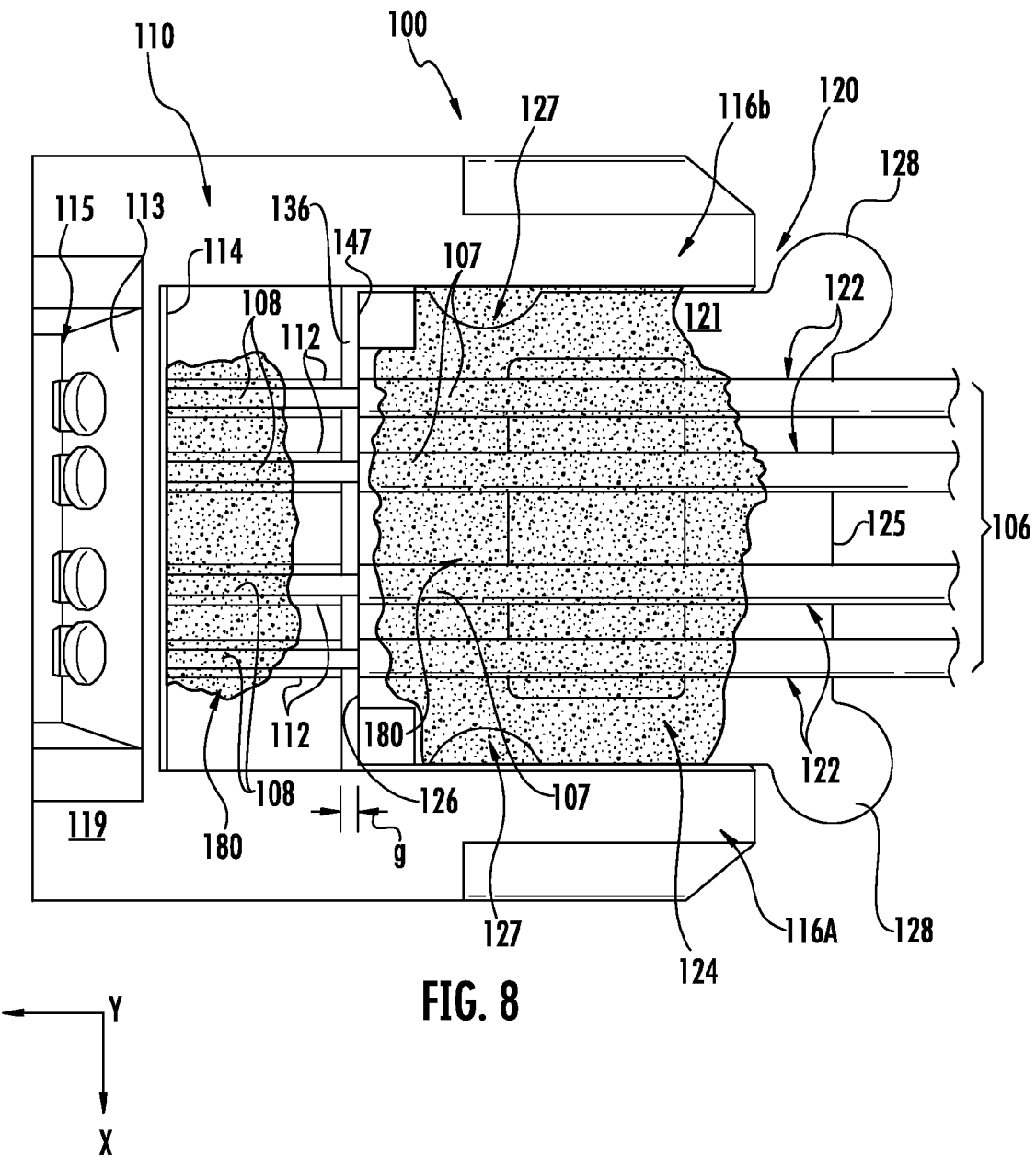
FIG. 8 is a top view of an assembled fiber optic module of the optical-electrical connector depicted in FIG. 1.

Once the location of the fiber ends 109 is verified, the fiber tray 120 and exposed core 108 of the optical fibers 106 are secured to the body 110 using a suitable material (block 178) as shown in FIG. 8. An example of a suitable material is an index-matching adhesive 180 such as epoxy. The index-matching adhesive substantially matches the index of refraction of the material of the body 110 and the core 108 of the optical fibers 106, and may fill in any gaps that exist between the fiber ends 109 of the optical fibers 106 and the fiber-end datum surface 114. The fiber tray 120 may be secured to the fiber tray recess 118 portion of the body 110 by applying the index-matching adhesive to the adhesive receiving features 127, which, along with the inner surface of the arms 116A, 116B of the fiber tray insertion portion 144 define recesses to receive the index-matching adhesive. The adhesive 180 may flow beneath the fiber tray 120 and secure the fiber tray 120 to the floor 139 of the fiber tray recess 118. Similarly, the exposed core 108 of the optical fibers 106 may be secured to the fiber support features 112 by applying an index-matching adhesive, such as epoxy, to the fiber support ledge 147 and corresponding fiber support features 112, thereby also index-matching the fiber ends 109 to the fiber-end datum surface 114 for optical coupling.

In some embodiments, the fiber tray 120 may be secured to the body 110 prior to actively positioning the fiber ends 109 in the fiber support features 112. For example, adhesive 180 may first be applied to the adhesive receiving features 127, followed by active alignment of the fiber ends 109, and then securing the exposed core 108 to the fiber support features 112 with adhesive.

The body 110 is secured to a PCB substrate 103 such that the lenses 164, 165 are aligned with the corresponding active optical components 140S, 140D also secured to the PCB substrate 103 as shown in FIGS. 9A and 9B, which are introduced and discussed below.

Operation of the Fiber Optic Module and Active Optical Components

Operation of the fiber optic module 100 including the fiber tray 120 and the body 110 and active optical components will now be described with reference to FIGS. 9A and 9B.

FIG. 9A illustrates active optical component in the form of light source device 140S residing atop the PCB substrate 103 (or an IC chip atop the PCB substrate 103). The light source device 140S has a device axis 154 that is substantially aligned with the lens axis 153 of the at least one lens 165 provided by the body 110. In the configuration shown in FIG. 9A, the light source device 140S generates divergent light 150 that travels generally along lens axis 153 toward lens 165 over a source optical path $OP_S$. The divergent light 150 is incident upon convex lens surface 135, which serves to convert the divergent light into convergent light 150, which then travels within the body 110 along source optical path $OP_S$. The convergent light 150 is ultimately incident upon the TIR surface 113, which reflects this light by substantially 90° so that the light now travels toward the fiber-end datum surface 114 along source optical path $OP_S$ toward the optical fiber 106. The convergent light 150 travels through the fiber-end datum surface 114 and enters the optical fiber end 109, where this light continues to travel within optical fiber 106. Note that the light 150 may pass through a thin portion of index-matching material (e.g., index-matching epoxy) if such material is disposed between the optical fiber end 109 and the fiber-end datum surface 114.

In an example embodiment similar to that shown in FIG. 9A, the lens surface 135 forms substantially collimated light that reflects from the TIR surface 113 at substantially 90° and exits the fiber-end datum surface 114 as substantially collimated light. This embodiment can be used, for example, in certain cases where optical fiber 106 has a gradient-index core 108 and light 150 is preferably introduced into the core 108 as substantially collimated light. Note that such a gradient-index optical fiber will bring light 150 to a focus at some distance from the optical fiber end 109. The lens surface 135 is offset from the light source device 140S by a height $H_S$ such that the light 150 is brought to a focus at a location within the core 108 of the optical fiber 106.

FIG. 9B is similar to FIG. 9A and shows an example where the PCB substrate 103 (or an IC chip) operably supports a photodetector 140D (e.g., a photodiode). The photodetector 140D has a device axis 154 that is substantially aligned with the lens axis 153 of the at least one lens 164 provided by the body 110. In the configuration shown in FIG. 9B, guided light (emitted from a light source device at an opposite end of the optical cable assembly) exits the optical fiber end 109 as divergent light 150. This divergent light 150 passes through the fiber-end datum surface 114 and into the body 110 of the fiber optic module 100 as it travels over a detector optical path $OP_D$. Note that the light 150 may pass through a thin portion of index-matching material (e.g., index-matching epoxy) if such material is disposed between the optical fiber end 109 and the fiber-end datum surface 114.

The divergent light 150 is then incident upon the TIR surface 113 and reflects therefrom by substantially 90° to travel along lens axis 153 over the detector optical path $OP_D$. The divergent light 150 continues diverging as it travels within the material of the body 110 to the at least one lens surface 134. The lens surface 134 serves to convert divergent light 150 into convergent light 150 as it exits body 110 and travels toward photodetector 140D. The lens surface 134 is offset from the photodetector 140D by a height $H_D$ such that the convergent light 150 is generally focused down onto the photodetector 140D. The photodetector 140D then receives this focused light 150 and converts it into an electrical signal (not shown) such as a photocurrent that is directed elsewhere for processing.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A fiber tray for coupling with a fiber optic module, the fiber tray comprising:
   a first surface and a second surface opposite from the first surface;
   a first edge and a second edge opposite the first edge, wherein the second edge is configured to engage a datum surface of a fiber optic module;
   a plurality of fiber support features on the first surface, wherein the plurality of fiber support features are configured to receive a plurality of optical fibers;

a first adhesive receiving feature and a second adhesive receiving feature disposed between the first surface and the second surface;
an adhesive well extending a depth into the fiber tray from the first surface and across the plurality of fiber support features; and
the plurality of optical fibers are disposed within the plurality of fiber support features and the plurality of optical fibers have respective ends, wherein the respective ends of the plurality of optical fibers extend beyond the second edge of the fiber tray by a length $L_f$.

2. The fiber tray of claim 1, wherein the adhesive well is positioned at the first surface.

3. The fiber tray of claim 1, wherein the first adhesive receiving feature and the second adhesive receiving feature are located closer to the second edge than to the first edge.

4. The fiber tray of claim 1, further comprising a first additional adhesive receiving feature located at a third edge and a second additional adhesive receiving feature located at a fourth edge.

5. The fiber tray of claim 1, further comprising one or more tilting features.

6. The fiber tray of claim 1, wherein the plurality of optical fibers have a portion of their coating stripped away.

7. The fiber tray of claim 1, wherein the second edge comprises a chamfer.

8. A fiber optic module comprising:
a body that is transmissive to light having a predetermined wavelength, the body of the fiber optic module comprising:
 a first surface and a second surface that is opposite from the first surface;
 a total-internal-reflection (TIR) surface extending from the first surface, wherein the TIR surface is operable to reflect an optical signal of light propagating within the fiber optic module by total internal reflection;
 a fiber-end datum surface located proximate the TIR surface such that optical signals propagating through the fiber-end datum surface are reflected at the TIR surface;
 a plurality of lens surfaces formed on the second surface of the body, wherein the plurality of lens surfaces, the TIR surface, the fiber-end datum surface and intervening portions of the body define a plurality of lenses each having a folded optical axis; and
 a fiber tray recess; and
a fiber tray comprising:
 a plurality of fiber support features disposed on a first surface, wherein:
  the plurality of fiber support features is configured to receive a plurality of optical fibers; and
  the fiber tray is disposed within the fiber tray recess and secured to the body using an adhesive such that fiber-ends of the plurality of optical fibers disposed in the plurality of fiber support features are positioned at the fiber-end datum surface of the body and are substantially aligned with the folded optical axes of the plurality of lenses.

9. The fiber optic module of claim 8, wherein:
the fiber tray further comprises:
 a first adhesive receiving feature and a second adhesive receiving feature; and
 an adhesive well extending a depth into the fiber tray from the first surface and across the plurality of fiber support features.

10. The fiber optic module of claim 9, wherein the adhesive well is positioned at the first surface.

11. The fiber optic module of claim 9, wherein the first adhesive receiving feature and the second adhesive receiving feature are located closer to a second edge than a first edge.

12. The fiber optic module of claim 9, wherein the fiber tray further comprises a first additional adhesive receiving feature and a second additional adhesive receiving feature.

13. The fiber optic module of claim 8, wherein the fiber tray includes one or more tilting features.

14. The fiber optic module of claim 8, wherein:
the body further comprises a plurality of fiber support features having a first end and a second end at the fiber-end datum surface; and
the plurality of fiber support features of the fiber tray are substantially aligned with the plurality of fiber support features of the body.

15. An optical-electrical connector comprising:
a substrate comprising a surface and a plurality of active optical components coupled to the surface;
a plurality of optical fibers, each optical fiber having a core surrounded by an outer coating, wherein each optical fiber comprises a stripped region where the core is exposed for a length from a fiber-end;
a fiber optic module having a body that is transmissive to light having a predetermined wavelength, the body comprising:
 a first surface and a second surface that is opposite from the first surface;
 a total-internal-reflection (TIR) surface extending from the first surface, wherein the TIR surface is operable to reflect an optical signal of light propagating within the body by total internal reflection;
 a fiber-end datum surface located proximate the TIR surface such that optical signals propagating through the fiber-end datum surface are reflected at the TIR surface;
 a plurality of fiber support features terminating at the fiber-end datum surface;
 a plurality of lens surfaces formed on the second surface of the body, wherein the plurality of lens surfaces, the TIR surface, the fiber-end datum surface and intervening portions of the body define a plurality of lenses each having a folded optical axis; and
 a fiber tray recess, wherein the body is coupled to the surface of the substrate such that the plurality of lens surfaces is aligned with the plurality of active optical components; and
a fiber tray comprising a first edge and a second edge opposite from the first edge, wherein:
 the plurality of optical fibers is disposed within the fiber tray such that each individual optical fiber extends beyond the second edge by an offset length $L_f$; and
 the fiber tray is disposed within the fiber tray recess and secured to the body using an adhesive such that the stripped region of the plurality of optical fibers are disposed in the plurality of fiber support features, and fiber-ends of the plurality of optical fibers are positioned at the fiber-end datum surface and are substantially aligned with the folded optical axes of the plurality of lenses.

16. The optical-electrical connector of claim 15, wherein:
the fiber tray further comprises:
 a first adhesive receiving feature and a second adhesive receiving feature;
 an adhesive well extending a depth into the fiber tray from the first surface; and the optical-electrical connector further comprises an adhesive disposed in the first and second adhesive receiving features for securing the fiber tray to the body at the fiber tray recess; and
an adhesive disposed in the adhesive well for securing the plurality of optical fibers disposed to the fiber tray.

17. The optical-electrical connector of claim 15, wherein:
the plurality of active optical components comprises at least one light source device and at least one photodetector;
a lens surface of the plurality of lens surfaces aligned with the at least one light source device is offset from a surface of the at least one light source device by a height $H_S$; and
a lens surface of the plurality of lens surfaces aligned with the at least one photodetector is offset from a surface of the at least one photodetector by a height $H_D$, wherein $H_S$ is greater than $H_D$.

18. A method for making a fiber optic module comprising:
positioning a plurality of optical fibers having a core surrounded by an outer coating in a plurality of fiber support features in a first surface of a fiber tray such that the plurality of optical fibers extend beyond an edge of the fiber tray by an offset length;
applying an adhesive to at the first surface of the fiber tray to secure the plurality of optical fibers to the fiber tray;
stripping the outer coating of each optical fiber of the plurality of optical fibers to expose the core, thereby forming a stripped region of each optical fiber;
positioning the fiber tray into a body of a fiber optic module, the fiber optic module comprising:
a total-internal-reflection (TIR) surface extending from a first surface;
a fiber-end datum surface located proximate the TIR surface; and
a plurality of fiber support features terminating at the fiber-end datum surface, wherein the fiber tray is secured to the body using an adhesive such that the stripped regions of the plurality of optical fibers are disposed within the plurality of fiber support features and a fiber-end of each optical fiber is positioned at the fiber-end datum surface.

19. The method of claim 18, wherein stripping the outer coating of each optical fiber of the plurality of optical fibers is performed by a laser stripping process.

20. The method of claim 18, further including applying an adhesive for securing the fiber tray to the body.

21. The method of claim 18, wherein each optical fiber is cleaved to a desired length $L_f$ beyond the edge of the fiber tray.

* * * * *

UNITED STATES PATENT AND TRADEMARK OFFICE
CERTIFICATE OF CORRECTION

PATENT NO. : 9,201,201 B2  
APPLICATION NO. : 13/838417  
DATED : December 1, 2015  
INVENTOR(S) : Charbonneau-Lefort et al.

Page 1 of 1

It is certified that error appears in the above-identified patent and that said Letters Patent is hereby corrected as shown below:

On the title page item [72], insert --Carl Randall Harrison, Decatur, TX (US)--

Signed and Sealed this
Second Day of August, 2016

Michelle K. Lee
*Director of the United States Patent and Trademark Office*